US012413864B2

(12) United States Patent
Feng

(10) Patent No.: US 12,413,864 B2
(45) Date of Patent: Sep. 9, 2025

(54) PHOTOGRAPHING METHOD FROM PLURALITY OF ARTIFICIAL LIGHT SOURCES AND RELATED APPARATUS

(71) Applicant: HONOR DEVICE CO., LTD., Shenzhen (CN)

(72) Inventor: Hanyu Feng, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 43 days.

(21) Appl. No.: 18/266,222

(22) PCT Filed: May 18, 2022

(86) PCT No.: PCT/CN2022/093644
§ 371 (c)(1),
(2) Date: Jun. 8, 2023

(87) PCT Pub. No.: WO2022/267762
PCT Pub. Date: Dec. 29, 2022

(65) Prior Publication Data
US 2023/0388658 A1    Nov. 30, 2023

(30) Foreign Application Priority Data
Jun. 24, 2021   (CN) .......................... 202110708031.2

(51) Int. Cl.
*H04N 23/745* (2023.01)
*H04N 23/72* (2023.01)
*H04N 23/73* (2023.01)

(52) U.S. Cl.
CPC ........... *H04N 23/745* (2023.01); *H04N 23/72* (2023.01); *H04N 23/73* (2023.01)

(58) Field of Classification Search
CPC ...... H04N 23/745; H04N 23/72; H04N 23/73; H04N 23/741; H04N 23/81; G03B 2215/0557; G03B 15/035
See application file for complete search history.

(56) References Cited

U.S. PATENT DOCUMENTS 7,164,439 B2    1/2007   Yoshida et al.
7,764,312 B2    7/2010   Ono et al.
(Continued)

FOREIGN PATENT DOCUMENTS

CN    1437389 A    8/2003
CN    1863277 A    11/2006
(Continued)

*Primary Examiner* — Sinh Tran
*Assistant Examiner* — Angel L Garces-Rivera
(74) *Attorney, Agent, or Firm* — WOMBLE BOND DICKINSON (US) LLP

(57) ABSTRACT

This application provides a photographing method from a plurality of artificial light sources and a related apparatus. An electronic device may determine flicker frequencies of the plurality of artificial light sources, and select two of the flicker frequencies, denoted as F1 and F2. Flicker periods corresponding to F1 and F2 are denoted as T1 and T2, respectively. Based on these two flicker periods (T1 and T2), the electronic device determines the exposure time and frame interval to be used for the next image acquisition by the electronic device. The method can eliminate a banding phenomenon caused by a single artificial light source and attenuate a banding phenomenon caused by other artificial light sources, avoiding scrolling bright and dark streaks in images on the electronic device.

20 Claims, 14 Drawing Sheets

(56) References Cited

U.S. PATENT DOCUMENTS

| | | |
|---|---|---|
| 2002/0044205 A1 | 4/2002 | Nagaoka et al. |
| 2005/0093996 A1 | 5/2005 | Kinoshita |
| 2007/0153094 A1 | 7/2007 | Noyes et al. |
| 2010/0053369 A1 | 3/2010 | Nagai et al. |
| 2013/0342726 A1 | 12/2013 | Ebina et al. |
| 2015/0229824 A1 | 8/2015 | Tanaka et al. |
| 2017/0094148 A1 | 3/2017 | Tsukagoshi |
| 2017/0134634 A1 | 5/2017 | Jin et al. |
| 2021/0112189 A1 | 4/2021 | Gang et al. |

FOREIGN PATENT DOCUMENTS

| | | |
|---|---|---|
| CN | 101394483 A | 3/2009 |
| CN | 101567977 A | 10/2009 |
| CN | 108111767 A | 6/2018 |
| CN | 109151256 A | 1/2019 |
| CN | 110248110 A | 9/2019 |
| CN | 110381276 A | 10/2019 |
| CN | 111355864 A | 6/2020 |
| JP | 2012094956 A | 5/2012 |
| JP | 2013238479 A | 11/2013 |
| JP | 2015054221 A | 3/2015 |
| JP | 2020129756 A | 8/2020 |

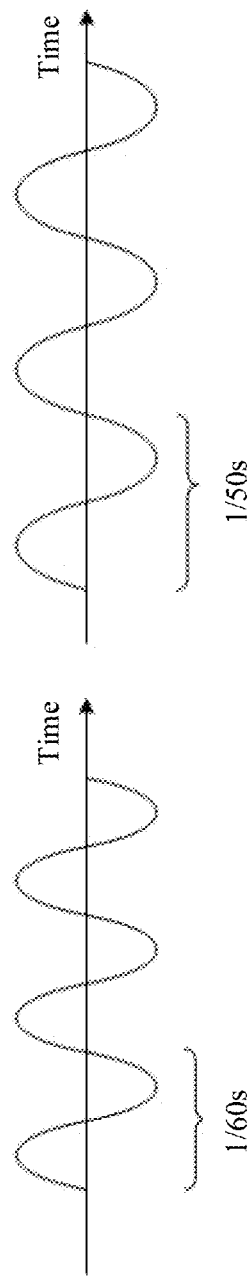

PHOTOGRAPHING METHOD FROM PLURALITY OF ARTIFICIAL LIGHT SOURCES AND RELATED APPARATUS

CROSS-REFERENCE TO RELATED APPLICATIONS

This application is a National Stage of International Application No. PCT/CN2022/093644, filed on May 18, 2022, which claims priority to Chinese Patent Application No. 202110708031.2, filed on Jun. 24, 2021, both of which are hereby incorporated by reference in their entireties.

TECHNICAL FIELD

This application relates to the field of terminal technologies, and in particular, to a photographing method from a plurality of artificial light sources and a related apparatus.

BACKGROUND

If an artificial light source is present in a photographing environment, a stroboscopic flash phenomenon of the artificial light source may cause scrolling bright and dark streaks in captured images. The bright and dark streaks in the images may be usually eliminated by adjusting an exposure time to an integer multiple of a flicker period of the artificial light source. However, the exposure time adjustment method is only applicable to the photographing scenario of an artificial light source with one flicker frequency, not to the scenario of a plurality of artificial light sources. Therefore, if a plurality of artificial light sources are present in the photographing environment, a problem of a scrolling streak phenomenon in captured images cannot be resolved, affecting user experience greatly.

Therefore, how to attenuate bright and dark streaks in captured images in a scenario of a plurality of artificial light sources is an urgent problem to be resolved.

SUMMARY

This application provides a photographing method from a plurality of artificial light sources and a related apparatus. An electronic device may determine flicker frequencies of the plurality of artificial light sources, and select two of the flicker frequencies, denoted as F1 and F2. The electronic device determines, based on the two flicker frequencies, an exposure time and a frame interval used by the electronic device to obtain images subsequently. The method can eliminate a banding phenomenon caused by a single artificial light source and attenuate a banding phenomenon caused by other artificial light sources, avoiding scrolling bright and dark streaks in images on the electronic device.

According to a first aspect, this application provides a photographing method from a plurality of artificial light sources. The method may include the following steps: An electronic device may determine a first flicker period and a second flicker period, where the first flicker period may be a flicker period of a first artificial light source in a photographing environment, and the second flicker period may be a flicker period of a second artificial light source in the photographing environment. The electronic device may determine a first exposure time and a first frame interval, where if k1 times the first flicker period does not exceed a first range, the first exposure time is k1 times the first flicker period, and the first frame interval is k2 times the second flicker period, where both k1 and k2 are positive integers. The electronic device may photograph by using the first exposure time and the first frame interval, where the first frame interval is an interval between two adjacent frames of images captured by a camera in the photographing process.

In the solution provided in this application, the electronic device may determine the flicker periods (the first flicker period and the second flicker period) of the two artificial light sources that are present in the photographing environment, and photograph an image by using the first exposure time and the first frame interval. If k1 times the first flicker period does not exceed the first range, the first exposure time of the electronic device is k1 times the first flicker period, and the first frame interval is k2 times the second flicker period. The solution can eliminate a banding phenomenon caused by the first artificial light source and attenuate a banding phenomenon caused by the second artificial light source. To be specific, after the exposure time and the frame interval are adjusted according to the method, scrolling bright and dark streaks caused by the first artificial light source are no longer displayed on a display of the electronic device, and scrolling bright and dark streaks caused by the second artificial light source can no longer scroll, thereby improving user experience.

With reference to the first aspect, in a possible implementation of the first aspect, a luminous intensity of the first artificial light source may be greater than a luminous intensity of the second artificial light source.

In the solution provided in this application, the luminous intensity of the first artificial light source may be greater than the luminous intensity of the second artificial light source. To be specific, if a condition permits (k1 times the first flicker period does not exceed the first range), the banding phenomenon caused by the artificial light source with a large luminous intensity can be preferably eliminated. Because the banding phenomenon caused by the artificial light source with a large luminous intensity is more obvious, the banding phenomenon caused by the artificial light source with a large luminous intensity is preferably eliminated, so that the banding phenomenon can be attenuated to a maximum extent, and user experience is improved.

With reference to the first aspect, in a possible implementation of the first aspect, if k1 times the first flicker period exceeds the first range, and k2 times the second flicker period does not exceed the first range, the first exposure time is k2 times the second flicker period, and the first frame interval is k1 times the first flicker period.

In the solution provided in this application, if the exposure time cannot be adjusted to an integer multiple of the first flicker period, the exposure time may be adjusted to an integer multiple of the second flicker period, so that bright and dark streaks caused by at least one artificial light source can be eliminated, and an effect of the banding phenomenon on image display can be attenuated as much as possible.

With reference to the first aspect, in a possible implementation of the first aspect, if k1 times the first flicker period exceeds the first range, and k2 times the second flicker period also exceeds the first range, the first frame interval is k1 times the first flicker period.

In the solution provided in this application, if the exposure time cannot be adjusted to eliminate bright and dark streaks caused by one artificial light source in the photographing environment, it is possible to adjust only the frame interval to attenuate the banding phenomenon.

In some embodiments, the electronic device may adjust only the frame interval to an integer multiple of a flicker period of one artificial light source in the photographing environment, and continue to use an exposure time adjusted by an automatic exposure system, or may directly use an exposure time by which a latest frame of image is obtained to obtain a next frame of image. It may be understood that the electronic device may adjust the exposure time in other manners, which is not limited in this application.

With reference to the first aspect, in a possible implementation of the first aspect, that the electronic device determines the first flicker period and the second flicker period specifically includes the following steps: The electronic device may obtain a first time sequence, where the first time sequence includes ambient brightness information and time information. The electronic device may convert the first time sequence into a first spectrum. The electronic device may determine a frequency of a first sine wave as a first flicker frequency and a frequency of a second sine wave as a second flicker frequency based on the first spectrum. The electronic device may determine the first flicker period based on the first flicker frequency and determine the second flicker period based on the second flicker frequency. A difference between an amplitude of the first sine wave and a first average is greater than a first preset threshold; a difference between an amplitude of the second sine wave and a second average is greater than a second preset threshold; the first average is an average of amplitudes of sine waves other than the first sine wave within a frequency search range for the first spectrum; the second average is an average of amplitudes of sine waves other than the first sine wave and the second sine wave within the frequency search range for the first spectrum; and the frequency search range is used for determining a frequency range for searching the first sine wave and the second sine wave.

In the solution provided in this application, the electronic device may obtain a time sequence by collecting ambient brightness information and time information, and then convert the time sequence into a spectrum according to a Fourier principle. The electronic device may determine a flicker period of an artificial light source based on the spectrum. It may be understood that the electronic device determines the flicker period of the sine wave with the largest amplitude and the flicker period of the sine wave with the second largest amplitude in the spectrum. In other words, the flicker periods determined by the electronic device are the flicker periods of the artificial light sources with a largest luminous intensity and a second largest luminous intensity in the photographing environment. After the electronic device adjusts the exposure time and the frame interval based on the flicker periods, the banding phenomenon caused by the artificial light sources can be attenuated to a maximum extent.

With reference to the first aspect, in a possible implementation of the first aspect, two or more artificial light sources are present in the photographing environment; the first artificial light source is an artificial light source with a largest luminous intensity among the two or more artificial light sources; and the second artificial light source is an artificial light source with a second largest luminous intensity among the two or more artificial light sources.

In the solution provided in this application, after the electronic device adjusts the exposure time and the frame interval based on the flicker periods of the artificial light sources with the largest luminous intensity and the second largest luminous intensity in the photographing environment, the banding phenomenon caused by the artificial light sources can be attenuated to a maximum extent.

With reference to the first aspect, in a possible implementation of the first aspect, a third artificial light source is present in the photographing environment. The method may further include the following steps: The electronic device determines a third flicker period, where the third flicker period is a flicker period of the third artificial light source; where if k1 times the first flicker period exceeds the first range, k2 times the second flicker period does not exceed the first range, and k3 times the third flicker period does not exceed the first range, the first exposure time is k3 times the third flicker period, and the first frame interval is k1 times the first flicker period.

In the solution provided in this application, if two or more artificial light sources are present in the photographing environment, the electronic device determines whether the exposure time can be adjusted based on the flicker period of the artificial light source with the largest luminous intensity, so that bright and dark streaks caused by one artificial light source in the photographing environment can be eliminated as much as possible.

According to a second aspect, this application provides an electronic device. The electronic device includes a camera, one or more memories, and one or more processors. The one or more processors are coupled to the camera and the one or more memories. The one or more memories are configured to store computer program code including computer instructions. The processor may be configured to determine a first flicker period and a second flicker period; where the first flicker period is a flicker period of a first artificial light source in a photographing environment, and the second flicker period is a flicker period of a second artificial light source in the photographing environment. The processor may be further configured to determine a first exposure time and a first frame interval; where if k1 times the first flicker period does not exceed a first range, the first exposure time is k1 times the first flicker period, and the first frame interval is k2 times the second flicker period; where both k1 and k2 are positive integers. The camera may be configured to photograph by using the first exposure time and the first frame interval; where the first frame interval is an interval between capturing two adjacent frames of images in the photographing process.

With reference to the second aspect, in a possible implementation of the second aspect, a luminous intensity of the first artificial light source is greater than a luminous intensity of the second artificial light source.

With reference to the second aspect, in a possible implementation of the second aspect, if k1 times the first flicker period exceeds the first range, and k2 times the second flicker period does not exceed the first range, the first exposure time is k2 times the second flicker period, and the first frame interval is k1 times the first flicker period.

With reference to the second aspect, in a possible implementation of the second aspect, if k1 times the first flicker period exceeds the first range, and k2 times the second flicker period also exceeds the first range, the first frame interval is k1 times the first flicker period.

With reference to the second aspect, in a possible implementation of the second aspect, when the processor is configured to determine the first flicker period and the second flicker period, the processor is specifically configured to: obtain a first time sequence, where the first time sequence includes ambient brightness information and time information; convert the first time sequence into a first spectrum; determine a frequency of a first sine wave as a first flicker frequency and a frequency of a second sine wave as a second flicker frequency based on the first spectrum; determine the first flicker period based on the first flicker frequency and determine the second flicker period based on the second flicker frequency, where a difference between an amplitude of the first sine wave and a first average is greater than a first preset threshold; a difference between an amplitude of the second sine wave and a second average is greater than a second preset threshold; the first average is an average of amplitudes of sine waves other than the first sine wave within a frequency search range for the first spectrum; the second average is an average of amplitudes of sine waves other than the first sine wave and the second sine wave within the frequency search range for the first spectrum; and the frequency search range is used for determining a frequency range for searching the first sine wave and the second sine wave.

With reference to the second aspect, in a possible implementation of the second aspect, two or more artificial light sources are present in the photographing environment; the first artificial light source is an artificial light source with a largest luminous intensity among the two or more artificial light sources; and the second artificial light source is an artificial light source with a second largest luminous intensity among the two or more artificial light sources.

With reference to the second aspect, in a possible implementation of the second aspect, a third artificial light source is present in the photographing environment; and the processor is further configured to determine a third flicker period; where the third flicker period is a flicker period of the third artificial light source. If k1 times the first flicker period exceeds the first range, k2 times the second flicker period does not exceed the first range, and k3 times the third flicker period does not exceed the first range, the first exposure time is k3 times the third flicker period, and the first frame interval is k1 times the first flicker period.

According to a third aspect, this application provides a computer-readable storage medium including instructions. When the instructions are run on an electronic device, the electronic device is enabled to perform the method described in any one of the first aspect and the possible implementations thereof.

According to a fourth aspect, an embodiment of this application provides a chip, the chip is applied to an electronic device and includes one or more processors, and the processor is configured to invoke computer instructions, so that the electronic device is enabled to perform any one of the possible implementations of the first aspect.

According to a fifth aspect, an embodiment of this application provides a computer program product including instructions; and when the computer program product is run on an electronic device, the electronic device is enabled to perform any one of the possible implementations of the first aspect.

It may be understood that the electronic device provided in the second aspect, the computer-readable storage medium provided in the third aspect, the chip provided in the fourth aspect, and the computer program product provided in the fifth aspect are all used to perform the method provided in the embodiments of this application. Therefore, for beneficial effects that can be achieved, refer to the beneficial effects in the corresponding method. Details are not described herein again.

BRIEF DESCRIPTION OF DRAWINGS

FIG. 2A is a waveform diagram of an alternating current according to an embodiment of this application;

FIG. 2B is a waveform diagram of another alternating current according to an embodiment of this application;

DESCRIPTION OF EMBODIMENTS

Figure 1:
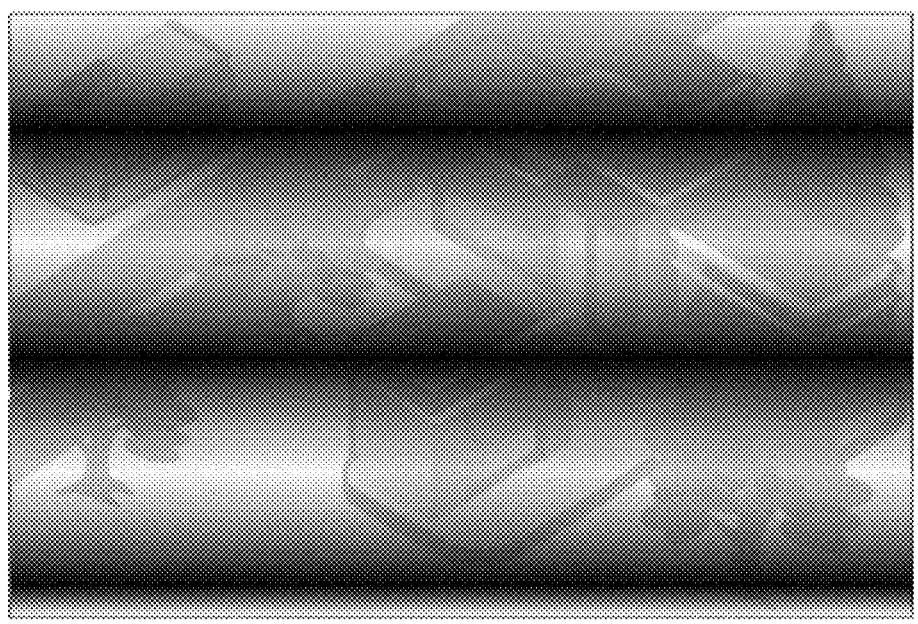
FIG. 1 is a schematic diagram of a banding phenomenon according to an embodiment of this application.

The following clearly describes the technical solutions in embodiments of this application with reference to the accompanying drawings in embodiments of this application. In descriptions of embodiments of this application, unless otherwise stated, "/" indicates or, for example, A/B may indicate A or B. "And/or" in the text is merely an association relationship that describes an associated object, and indicates that three relationships may exist. For example, A and/or B may indicate that there are three cases: only A exists, both A and B exist, and only B exists. In addition, in the descriptions of embodiments of this application, "a plurality of" means two or more.

It should be understood that the terms "first" and "second" in the specification, claims, and accompanying drawings of this application are used to distinguish different objects, and are not used to describe a specific sequence. In addition, the terms "include" and "have" and any variations thereof are intended to cover non-exclusive inclusion. For example, a process, method, system, product, or device that includes a series of steps or units is not limited to a listed step or unit, but optionally further includes an unlisted step or unit, or optionally further includes another step or unit inherent to the process, method, product, or device.

An "embodiment" in this application means that a specific feature, structure, or characteristic described with reference to the embodiment may be included in at least one embodiment of this application. The phrase appearing at various locations in the specification does not necessarily refer to a same embodiment, nor is a separate or alternative embodiment mutually exclusive with another embodiment. A person skilled in the art explicitly and implicitly understand that the embodiments described in this application may be combined with another embodiment.

This application relates to the field of photographing. To facilitate understanding of the method provided in this application, some terms in the field of photographing are described below.

1. Exposure

The exposure reflects an amount of light energy obtained by a photosensitive element when obtaining an image, and affects brightness of the final obtained image. A larger exposure for photographing one frame of image indicates higher brightness of this frame of image.

The exposure is determined by three major factors: an exposure time, a light-through area, and an ambient light intensity. The exposure time is determined by a shutter speed. The light-through area is determined by an aperture size. In the film age, a sensitivity of a film to light is reflected by a light sensitivity ISO, which can be considered to affect the ambient light intensity obtained by the photosensitive element. However, a photosensitive element in electronic devices such as a digital camera and a mobile phone remains unchanged after packaging. For these electronic devices, the ISO indicates no longer a sensitivity of the photosensitive element to light, but an amplification gain value of an electronic signal. A higher ISO indicates a larger amplification gain of the electronic signal, a larger original signal, and a brighter image.

In summary, the exposure time, the aperture size, and the ISO are three major factors that affect image brightness.

2. Exposure Intensity

In some embodiments, an aperture size of an electronic device such as a digital camera or a mobile phone is fixed, and the electronic device may adjust image brightness by adjusting an exposure time and an ISO. For ease of understanding and calculation, the exposure intensity is used to represent image brightness in subsequent embodiments of this application. A larger exposure intensity indicates a brighter image, while a smaller exposure intensity indicates a darker image. The electronic device may adjust the exposure intensity by adjusting the exposure time and the ISO. Specifically, the exposure intensity, the exposure time, and the ISO may have the following relationship: Exposure intensity=Exposure time*ISO.

3. Scrolling Streak Phenomenon

When an artificial light source is present in a photographing scenario, scrolling streak lines may appear in captured images (banding phenomenon for short). In other words, scrolling bright and dark streaks may appear in preview images on an electronic device such as a camera or a mobile phone. FIG. 1 illustrates an image obtained by an electronic device when an artificial light source is present in a photographing environment. It can be seen that FIG. 1 is not uniform in brightness and includes bright and dark streaks.

Causes of the banding phenomenon are described below.

In one aspect, description is given from the perspective of the artificial light source.

In daily life, alternating currents in sinusoidal waveforms are usually used. FIG. 2A illustrates an example waveform diagram of an alternating current at a frequency of 60 Hertz (Hz) for a power supply. FIG. 2B illustrates an example waveform diagram of an alternating current at a frequency of 50 Hz for a power supply.

When the artificial light source is powered by an alternating current, the artificial light source converts an electrical signal into an optical signal. Because the electrical signal is a periodic signal at a specific frequency, the optical signal obtained after conversion is also a periodic signal at a specific frequency. It may be understood that lights emitted by the artificial light source vary with time in frequency and period, that is, a stroboscopic flash phenomenon appears.

It may be understood that the stroboscopic flash phenomenon is caused by a design of the power supply and a characteristic of the artificial light source. Therefore, no stroboscopic flash does not exist in practice. For many lighting fixtures, an operating current will certainly fluctuate with fluctuation of an input voltage, and this directly causes fluctuation of a light output to generate a stroboscopic flash.

Figures 3A, 3B:
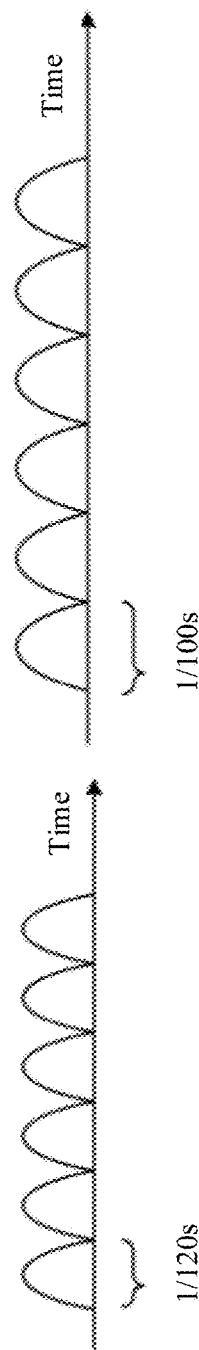
FIG. 3A is a waveform diagram of an optical signal according to an embodiment of this application.
FIG. 3B is a waveform diagram of another optical signal according to an embodiment of this application.

However, light energy emitted by the artificial light source is not directional, so that a waveform of the optical signal is no longer a sinusoidal waveform, but an envelope at a frequency of 100 Hz or 120 Hz. Specifically, as shown in FIG. 3A, when the artificial light source is powered by an alternating current of 60 Hz, the waveform of the optical signal obtained after conversion by the artificial light source is a periodic envelope at a frequency of 120 Hz. As shown in FIG. 3B, when the artificial light source is powered by an alternating current of 50 Hz, the waveform of the optical signal obtained after conversion by the artificial light source is a periodic envelope at a frequency of 100 Hz.

It can be learned that a flicker frequency of an artificial light source is usually twice a frequency of an alternating current powering the artificial light source. The flicker frequency of the artificial light source is not limited in the embodiment of this application. For example, the frequency of the alternating current powering the artificial light source is a frequency other than 50 Hz or 60 Hz, and the flicker frequency of the artificial light source may be a value other than 100 Hz or 120 Hz.

In another aspect, description is given from the perspective of the photographing electronic device.

Currently, a rolling shutter (Rolling Shutter) is usually used for an electronic device such as a digital camera or a mobile phone, and an exposure mode for the rolling shutter is row-by-row exposure.

Figure 4:
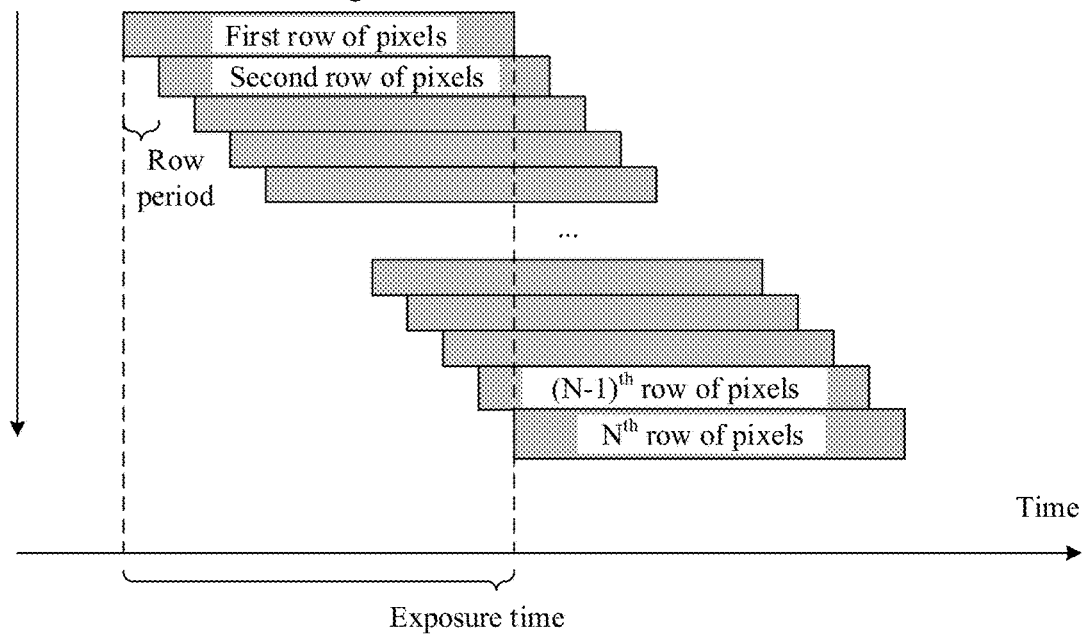
FIG. 4 is a schematic diagram illustrating an exposure principle of a sensor according to an embodiment of this application.

Specifically, as shown in FIG. 4, a sensor (for example, a CMOS image sensor) starts exposing a first row of pixels in a frame of image, and starts exposing a second row of pixels after an interval of one row period. By analogy, after exposure of an $(N-1)^{th}$ row of pixels starts, exposure of an $N^{th}$ row of pixels starts after an interval of one row period. That is, a difference between a time at which each row of pixels starts exposure and a time at which the next row of pixels starts exposure is one row period. Therefore, each row of pixels starts exposure at different times.

In this application, the exposure time is a time required for the electronic device to expose a row of pixels in a frame of image. Different rows of pixels in a same frame of image usually have a same exposure time.

It may be understood that the row period may be determined by a capability of the sensor. Different sensors may have different row periods, so that different electronic devices may also have different row periods. A value of the row period is not limited in the embodiment of this application.

It may be understood that in the schematic diagram (for example, FIG. 3A or FIG. 3B) of the optical signal obtained after conversion by the artificial light source, an area enclosed by the envelope and the X-axis over a period of time (a definite integral of a function corresponding to the envelope over this period of time) is light energy emitted by the artificial light source over this period of time, in other words, the light energy received by the sensor over this period of time.

If the $N^{th}$ row of pixels starts exposure at $T_1$ and ends exposure at $T_2$, the light energy received by the sensor over this period of time from $T_1$ to $T_2$ affects brightness of the $N^{th}$ row of pixels in the final displayed image. A larger amount of light energy received by the sensor from $T_1$ to $T_2$ indicates higher brightness of the $N^{th}$ row of pixels in the final displayed image. A smaller amount of light energy received by the sensor from $T_1$ to $T_2$ indicates lower brightness of the $N^{th}$ row of pixels in the final displayed image.

The following is described by taking an example in which an artificial light source powered by an alternating current of 50 Hz is present in a photographing environment.

Figure 5:
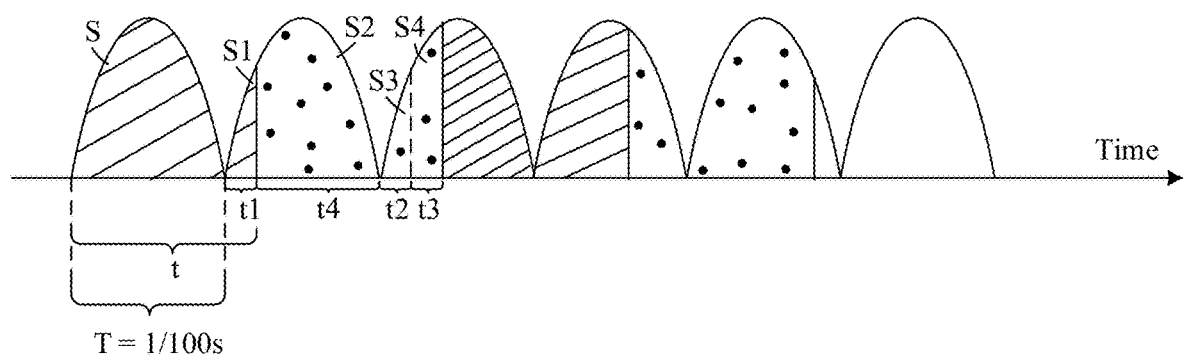
FIG. 5 is a waveform diagram of another optical signal according to an embodiment of this application.

As shown in FIG. 5, when the artificial light source is powered by the alternating current of 50 Hz, a waveform of an optical signal obtained after conversion by the artificial light source is a periodic envelope at a frequency of 100 Hz. A flicker period of the artificial light source is denoted as T, and T=1/100s. An exposure time in this case is t, that is, $T_2-T_1$=t. In other words, a time required for the sensor to expose each row in a frame of image is t. As can be seen from FIG. 5, t=T+t1. If t is not an integer multiple of the flicker period T, when the sensor exposes an $i^{th}$ row of pixels in the image, light energy received by the row of pixels is S+S1, where S may represent light energy received by the row of pixels within the time T, and S1 may represent light energy received by the row of pixels within the time t1. As can be seen from FIG. 5, t4+t2+t3=t. When the sensor exposes an $(i+1)^{th}$ row of pixels in the image, light energy received by the $(i+1)^{th}$ row of pixels is S2+S3+S4. Because t=t2=t3, S1=S3<S4. Therefore, the light energy received by the $(i+1)^{th}$ row of pixels is more than the light energy received by the $i^{th}$ row of pixels. In other words, the $i^{th}$ row of pixels and the $(i+1)^{th}$ row of pixels in the final displayed image are different in brightness. The $(i+1)^{th}$ row of pixels is brighter than the $i^{th}$ row of pixels.

It may be understood that because the optical signal obtained after conversion by the artificial light source is a periodic signal, at any start time, when $T_2-T_1$=M*T (M is a positive integer) and M remains unchanged, light energy received by the sensor from $T_1$ to $T_2$ remains unchanged, and different rows in the final displayed image are the same in brightness. At any start time, when $T_2-T_1$=M*T (M is not a positive integer) and M remains unchanged, light energy received by the sensor from $T_1$ to $T_2$ does not necessarily remain unchanged (as shown in FIG. 5), and different rows in the final displayed image are not necessarily the same in brightness. That is, bright and dark streaks may appear in the final displayed image.

In summary, if the exposure time is an integer multiple of the flicker period of the artificial light source, the image displayed by the electronic device does not have bright and dark streaks. If the exposure time is not an integer multiple of the flicker period of the artificial light source, the image displayed by the electronic device will have bright and dark streaks. Because the bright and dark streaks in different images may change in location, scrolling bright and dark streaks may appear in preview images or video images of the electronic device, in short, the banding phenomenon.

It should be noted that if optical signals corresponding to times at which the first rows in different images start exposure have a same phase, bright and dark streaks still appear in preview images on an electronic device such as a digital camera or a mobile phone. However, because the phase at the time at which the first row in each frame of image starts exposure remains the same, when the images are exposed by the sensor in these electronic devices, a magnitude relationship of the received light energy between different rows in each frame of image remains the same, so that light energy received by the $N^{th}$ row in each frame of image may be different from each other. In other words, the $N^{th}$ row in each frame of image may be different from each other in brightness, but remain unchanged in brightness relative to other rows in the same image.

If a plurality of artificial light sources (for example, two artificial light sources) are present in the photographing environment, and the flicker frequencies of these artificial light sources are the same, the banding phenomenon can be avoided by adjusting the exposure time to an integer multiple of the flicker period of these artificial light sources. However, if the flicker frequencies of the plurality of artificial light sources (for example, two artificial light sources) in the photographing environment are different, the exposure time may be adjusted to an integer multiple of the flicker period of one of the artificial light sources. In this case, a stroboscopic flash phenomenon of another artificial light source still leads to the banding phenomenon. In other words, scrolling bright and dark streaks still appear in the captured images.

Figure 6:
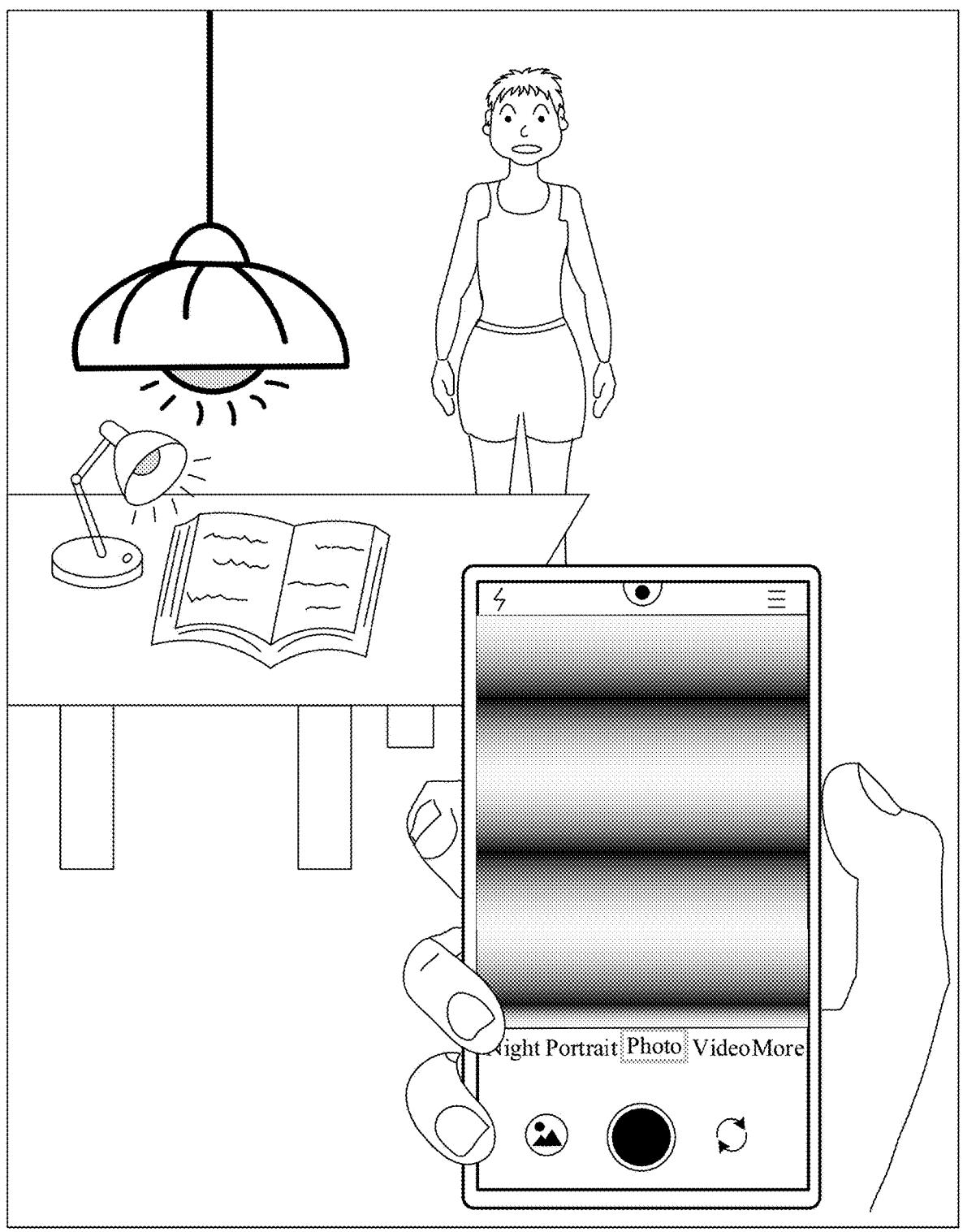
FIG. 6 is a schematic diagram of a scenario of a plurality of artificial light sources according to an embodiment of this application.

For example, in the photographing scenario shown in FIG. 6, there are two artificial light sources: a ceiling lamp and a desk lamp. The ceiling lamp is powered by an alternating current of 50 Hz, and a flicker period thereof is 1/100s. The desk lamp is charged through a universal serial bus (Universal Serial Bus, USB) interface, and if fully charged, has a frequency of 60 Hz and a flicker period of 1/60s. Because the flicker periods of the two artificial light sources are different, adjusting the exposure time can resolve only the problem of the banding phenomenon caused by the stroboscopic flash of one of the artificial light sources, but still cannot resolve the problem of the banding phenomenon caused by the stroboscopic flash of the other artificial light source, so that scrolling bright and dark streaks still appear in the captured images.

This application provides a photographing method from a plurality of artificial light sources and a related apparatus. An electronic device may determine flicker frequencies of the plurality of artificial light sources, and select two of the flicker frequencies, denoted as F1 and F2. Flicker periods corresponding to these two flicker frequencies are denoted as T1 and T2, respectively. If an exposure time is an integer multiple of T1, a corresponding ISO is also within a preset range, the exposure time is adjusted to an integer multiple of T1, and a frame interval is adjusted based on F2. If the exposure time is an integer multiple of T1 and the corresponding ISO is not within the preset range, it is determined whether the electronic device can adjust the exposure time to an integer multiple of T2 when the ISO is within the preset range. If yes, the electronic device adjusts the exposure time to the integer multiple of T2 and adjusts the frame interval based on F1. Otherwise, the electronic device does not adjust the exposure time and adjusts only the frame interval based on F1. The method can eliminate a banding phenomenon caused by a single artificial light source and attenuate a banding phenomenon caused by other artificial light sources, avoiding scrolling bright and dark streaks in images on the electronic device.

The following describes an apparatus related in the embodiments of this application.

Figure 7:
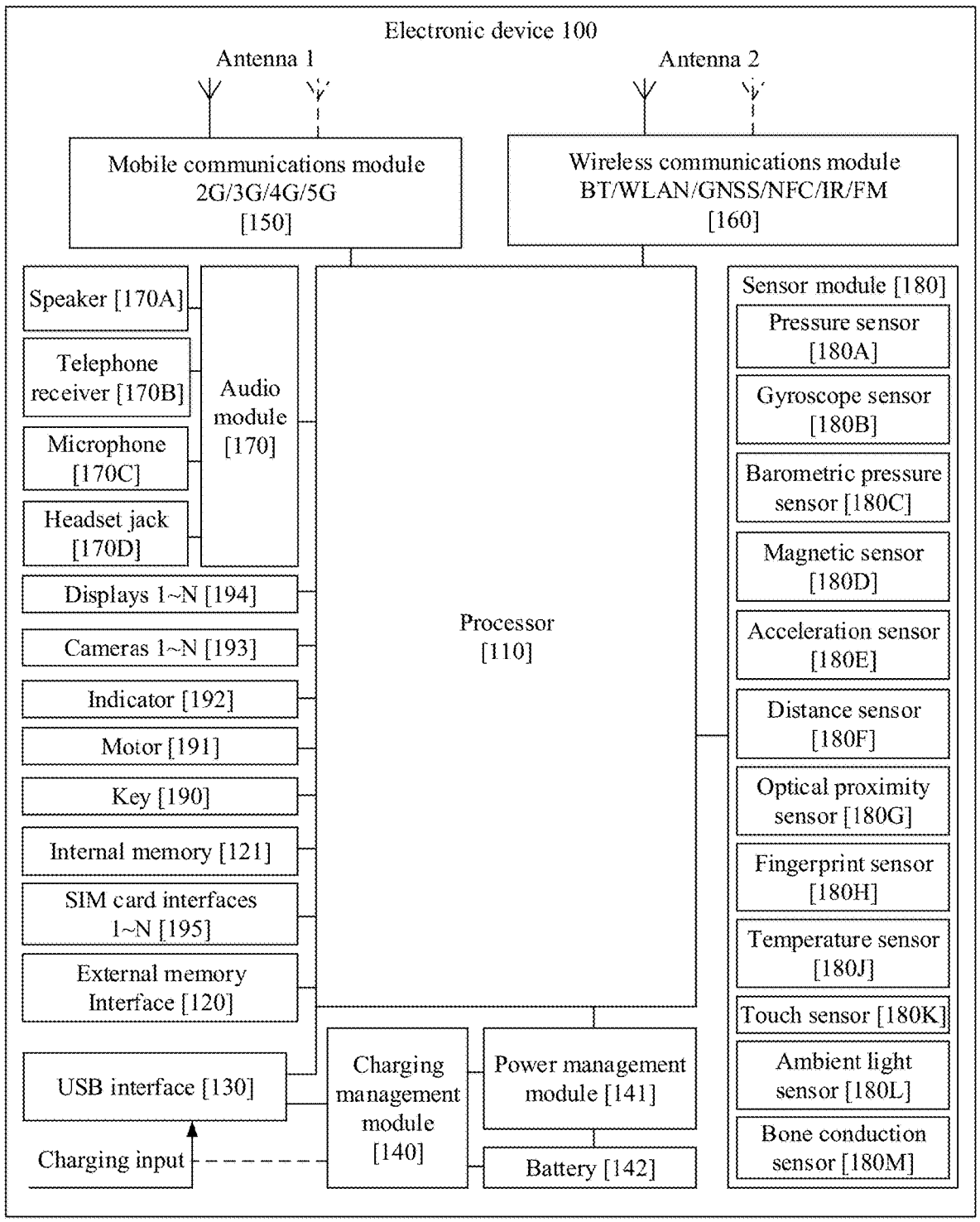
FIG. 7 is a schematic diagram of a hardware structure of an electronic device 100 according to an embodiment of this application.

FIG. 7 is a schematic diagram of a hardware structure of an electronic device 100 according to an embodiment of this application.

The electronic device 100 may include a processor 110, an external memory interface 120, an internal memory 121, a universal serial bus (Universal Serial Bus, USB) interface 130, a charging management module 140, a power management unit 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a key 190, a motor 191, an indicator 192, a camera 193, a display 194, a subscriber identity module (Subscriber Identification Module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that the structure illustrated in this embodiment of the present invention constitutes no specific limitation on the electronic device 100. In some other embodiments of this application, the electronic device 100 may include more or fewer components than those shown in the figure, or may combine some components, or may split some components, or may have different component arrangements. The illustrated components may be implemented by hardware, software, or a combination of software and hardware.

The processor 110 may include one or more processing units. For example, the processor 110 may include an application processor (Application Processor, AP), a modem processor, a graphics processing unit (Graphics Processing unit, GPU), an image signal processor (Image Signal Processor, ISP), a controller, a memory, a video codec, a digital signal processor (Digital Signal Processor, DSP), a baseband processor, a neural-network processing unit (Neural-network Processing Unit, NPU), and/or the like. Different processing units may be separate components, or may be integrated into one or more processors.

The controller may be a nerve center and a command center of the electronic device 100. The controller may generate an operation control signal based on instruction operation code and a time sequence signal, and complete control of instruction fetching and instruction execution.

It may be understood that the processor 110 may further include an AE system. The AE system may be specifically disposed in the ISP. The AE system can be configured to automatically adjust exposure parameters. Alternatively, the AE system may be integrated into another processor chip. This is not limited in the embodiments of this application.

In the embodiment provided in this application, the electronic device 100 may perform the photographing method from a plurality of artificial light sources by using the processor 110.

The processor 110 may further be provided with a memory for storing an instruction and data. In some embodiments, the memory in the processor 110 is a cache. The memory may store instructions or data recently used or repeatedly used by the processor 110. If the processor 110 needs to use the instructions or the data again, the processor 110 may directly invoke the instructions or the data from the memory, to avoid repeated access and reduce waiting time of the processor 110. This improves system efficiency.

In some embodiments, the processor 110 may include one or more interfaces. The USB interface 130 is an interface that complies with the USB standard specification, and specifically may be a mini USB interface, a micro USB interface, a USB type C interface, or the like. The USB interface 130 may be configured to connect to a charger to charge the electronic device 100, or may be used for data transmission between the electronic device 100 and a peripheral device, or may be configured to connect to a headset to play audio by using the headset. The interface may be further configured to connect to another electronic device 100, for example, an AR device.

The charging management module 140 is configured to receive charging input from the charger. When charging the battery 142, the charging management module 140 may further supply power to the electronic device 100 by using the power management module 141.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like.

The wireless communications function of the electronic device 100 can be implemented by the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communications frequency bands. Different antennas may be further multiplexed to increase antenna utilization.

The mobile communication module 150 may provide a solution to wireless communication such as 2G/3G/4G/5G applicable to the electronic device 100. The mobile communications module 150 may include at least one filter, at least one switch, at least one power amplifier, at least one low noise amplifier (Low Noise Amplifier, LNA), and the like. The mobile communications module 150 may receive an electromagnetic wave by using the antenna 1, perform processing such as filtering and amplification on the received electromagnetic wave, and send the processed electromagnetic wave to the modem processor for demodulation. The mobile communications module 150 may further amplify a signal modulated by the modem processor, and convert the signal into an electromagnetic wave by using the antenna 1 for radiation.

The modem processor may include a modulator and a demodulator. The modulator is configured to modulate a to-be-sent low-frequency baseband signal into a medium or high frequency signal. The demodulator is configured to demodulate a received electromagnetic wave signal into a low-frequency baseband signal. The demodulator then transfers the demodulated low-frequency baseband signal to the baseband processor for processing. The low-frequency baseband signal is processed by the baseband processor and then transferred to the application processor. The application processor outputs a sound signal by using an audio device (which is not limited to the speaker 170A, the telephone receiver 170B, and the like), or displays an image or a video on the display 194.

The wireless communications module 160 may provide a solution to wireless communications including a wireless local area network (Wireless Local Area Networks, WLAN) (such as a wireless fidelity (Wireless Fidelity, Wi-Fi) network), Bluetooth (Bluetooth, BT), a global navigation satellite system (Global Navigation Satellite System, GNSS), frequency modulation (Frequency Modulation, FM), a near field communication (Near Field Communication, NFC) technology, an infrared (Infrared, IR) technology, and the like applied to the electronic device 100. The wireless communications module 160 may be one or more components integrating at least one communications processor module. The wireless communications module 160 receives an electromagnetic wave by using the antenna 2, modulates and filters an electromagnetic wave signal, and sends a processed signal to the processor 110. The wireless communication module 160 may alternatively receive a to-be-sent signal from the processor 110, perform frequency modulation and amplification on the to-be-sent signal, and convert the signal into an electromagnetic wave for radiation through the antenna 2.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology.

The electronic device 100 implements a display function by using the GPU, the display 194, the application processor, and the like. The GPU is an image processing microprocessor and is connected to the display 194 and the application processor. The GPU is configured to perform mathematical and geometric calculations, and is configured to render graphics. The processor 110 may include one or more GPUs, and the GPU executes a program instruction to generate or change display information.

The display 194 is configured to display an image, a video, or the like, The display 194 includes a display panel. The display panel may be a liquid crystal display (Liquid Crystal Display, LCD), an organic light-emitting diode (Organic Light-Emitting Diode, OLED), an active-matrix organic light emitting diode (Active-Matrix Organic Light Emitting Diode, AMOLED), a flexible light-emitting diode (Flex Light-Emitting Diode, FLED), a mini LED, a micro LED, a micro OLED, a quantum dot light emitting diode (Quantum Dot Light Emitting Diodes, QLED), or the like. In some embodiments, the electronic device 100 may include 1 or N displays 194, where N is a positive integer greater than 1.

The electronic device 100 may implement a capturing function by using the ISP, the camera 193, the video codec, the GPU, the display 194, the application processor, and the like.

The ISP is configured to handle data returned by the camera 193. For example, during photographing, a shutter is open, allowing light to be transmitted to a photosensitive element of the camera through a lens. An optical signal is converted into an electrical signal. The photosensitive element of the camera transfers the electrical signal to the ISP for processing, to convert the electrical signal into an image or a video visible to the naked eye. The ISP may also perform algorithm optimization on noise, brightness, and skin tone of an image. The ISP may also optimize parameters such as exposure and color temperature of a photographing scenario. In some embodiments, the ISP may be disposed in the camera 193.

The camera 193 is configured to capture still images or videos. An optical image is generated for an object through the lens and is projected to the photosensitive element. The photosensitive element may be a charge coupled device (Charge Coupled Device, CCD) or a complementary metal-oxide-semiconductor (Complementary Metal-Oxide-Semiconductor, CMOS) phototransistor. The photosensitive element converts an optical signal into an electrical signal, and then transfers the electrical signal to the ISP that converts the electrical signal into a digital image or a video signal. The ISP outputs the digital image or the video signal to the DSP for processing. The DSP converts the digital image or the video signal into an image or a video signal in a standard format, such as RGB or YUV. In some embodiments, the electronic device 100 may include 1 or N cameras 193, where N is a positive integer greater than 1. For example, in some embodiments, the electronic device 100 may obtain images of a plurality of exposure coefficients by using the N cameras 193. Further, during video post-processing, the electronic device 100 may composite an HDR image based on the images of the plurality of exposure coefficients by using an HDR technology.

The digital signal processor is configured to process a digital signal. In addition to processing a digital image or a video signal, the digital signal processor can further process another digital signal. For example, when the electronic device 100 selects a frequency, the digital signal processor is configured to perform Fourier transform or the like on energy of the frequency.

The video codec is configured to compress or decompress a digital video. The electronic device 100 may support one or more types of video codecs. In this way, the electronic device 100 may play or record videos in a plurality of coding formats, such as moving picture experts group (Moving Picture Experts Group, MPEG)1, MPEG2, MPEG3, and MPEG4.

The NPU is a neural-network (Neural-Network, NN) computing processor that processes input information rapidly by referring to a structure of a biological neural network, for example, by referring to a transmission mode between human brain neurons, and can further perform self-learning continuously. Applications like intelligent cognition, such as, image recognition, face recognition, speech recognition, and text understanding, of the electronic device 100, can be implemented by using the NPU.

The external memory interface 120 may be configured to connect to an external memory card, for example, a micro SD card, to expand a storage capacity of the electronic device 100. The external memory card communicates with the processor 110 through the external memory interface 120, to implement a data storage function. For example, files such as music and a video are stored in the external memory card.

The internal memory 121 may be configured to store computer executable program code, and the executable program code includes an instruction. The processor 110 executes various function applications and data processing of the electronic device 100 by running the instructions stored in the internal memory 121. The internal memory 121 may include a program storage area and a data storage area. The program storage area may store an operating system, an application required by at least one function (for example, a sound play function or an image/video play function), and the like. The data storage area may store data (such as audio data and a phone book) and the like that are created during use of the electronic device 100.

The electronic device 100 can implement audio functions, such as music playing and recording, by using the audio module 170, the speaker 170A, the telephone receiver 170B, the microphone 170C, the headset jack 170D, the application processor, and the like.

The audio module 170 is configured to convert digital audio information into an analog audio signal for outputting, and is further configured to convert analog audio input into a digital audio signal.

The speaker 170A, also referred to as a "horn", is configured to convert an electrical audio signal into a sound signal.

The telephone receiver 170B, also referred to as an "earpiece", is configured to convert an electrical audio signal into a sound signal.

The microphone 170C, also referred to as a "mic" or "mike", is configured to convert a sound signal into an electrical signal. At least one microphone 170C may be disposed in the electronic device 100.

The headset jack 170D is configured to connect a wired headset.

The sensor module 180 may include one or more sensors, which may be of a same type or different types. It may be understood that the sensor module 180 shown in FIG. 7 is merely an example division manner, and there may be another division manner. This is not limited in this application.

The pressure sensor 180A is configured to sense a pressure signal, and is capable of converting the pressure signal to an electrical signal. In some embodiments, the pressure sensor 180A may be arranged on the display screen 194. When a touch operation acts on the display 194, the electronic device 100 detects intensity of the touch operation by using the pressure sensor 180A. The electronic device 100 may also calculate a touched location based on a detected signal of the pressure sensor 180A. In some embodiments, touch operations acting on the same touch location but with different touch operation intensities may correspond to different operation instructions.

The gyroscope sensor 180B may be configured to determine a movement posture of the electronic device 100. In some embodiments, the gyroscope sensor 180B may be configured to determine angular velocities of the electronic device 100 around three axes (that is, x, y, and z axes). The gyroscope sensor 180B may be used for image stabilization during photographing.

The barometric pressure sensor 180C is configured to measure barometric pressure. In some embodiments, the electronic device 100 calculates an altitude based on a barometric pressure value measured by the barometric pressure sensor 180C to assist in positioning and navigation.

The magnetic sensor 180D may include a Hall effect sensor. The electronic device 100 may detect an opening state or a closing state of a flip leather case by using the magnetic sensor 180D.

The acceleration sensor 180E may detect acceleration values of the electronic device 100 in all directions (usually in three axes), and may detect a magnitude and a direction of the gravity when the electronic device 100 is still. The acceleration sensor 180E may be further configured to recognize a posture of the electronic device 100, and be applied to switching between landscape orientation and portrait orientation, a pedometer, or another application.

The distance sensor 180F is configured to measure a distance. The electronic device 100 may measure a distance by using an infrared or laser technology. In some embodiments, in a photographing scenario, the electronic device 100 may measure a distance by using the distance sensor 180F, to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 uses the photodiode to detect reflected infrared light from a nearby object. When abundant reflected light is detected, it may be determined that an object exists near the electronic device 100. When insufficient reflected light is detected, the electronic device 100 may determine that no object exists near the electronic device 100.

The ambient light sensor 180L is configured to sense ambient light brightness.

The fingerprint sensor 180H is configured to obtain a fingerprint.

The temperature sensor 180J is configured to detect temperature.

The touch sensor 180K is also called a "touch panel". The touch sensor 180K may be disposed on the display 194. The touch sensor 180K and the display 194 form a touch screen, also referred to as a "touch control screen" The touch sensor 180K is configured to detect a touch operation acting on or near the touch sensor 180K. The touch sensor may pass a detected touch operation to the application processor to determine a touch event type. The display 194 may be configured to provide a visual output related to the touch operation. In some other embodiments, the touch sensor 180K may be alternatively disposed on a surface of the electronic device 100, in a location different from that of the display 194.

In an embodiment of this application, when a user performs time-lapse photographing or burst shooting by using the electronic device 100, a series of images need to be obtained. In a time-lapse photographing or burst shooting scenario, the electronic device 100 may use an AE mode. That is, the electronic device 100 automatically adjusts an AE value. In a process of previewing the series of images, if the user performs a touch operation on the display 194, a touch AE mode may be triggered. In the touch AE mode, the electronic device 100 may adjust brightness of a corresponding location of the display touched by the user, and perform high-weight light measurement. When an average brightness of a picture is calculated, a weight of a touch area of the user is significantly greater than another area. Finally, a calculated average brightness of the picture is closer to an average brightness of the touch area of the user.

The bone conduction sensor 180M may obtain a vibration signal.

The key 190 includes a power on/off key, a volume key, and the like. The button 190 may be a mechanical button, or may be a touch key. The electronic device 100 may receive button input, and generate button signal input related to user settings and function control of the electronic device 100.

The motor 191 may generate a vibration alert. The motor 191 may be used for vibration alerts for incoming calls, and may also be used for touch vibration feedback. For example, touch operations on different applications (such as photographing and audio playing) may correspond to different vibration feedback effects. For touch operations performed in different regions of the display 194, the motor 191 may also correspond to different vibration feedback effects. Different application scenarios (for example, a time reminder, receiving information, an alarm clock, and a game) may also correspond to different vibration feedback effects. The touch vibration feedback effect may also be customized.

The indicator 192 may be an indicator light, and may be used to indicate a charging status or a power change, or may be used to indicate a message, a missed call, a notification, or the like.

The SIM card interface 195 is configured to connect to a SIM card. The SIM card may be inserted into the SIM card interface 195 or pulled out of the SIM card interface 195 to achieve contact with or separation from the electronic device 100. The electronic device 100 may support 1 or N SIM card interfaces, where N is a positive integer greater than 1. The electronic device 100 interacts with a network by using a SIM card, to implement functions such as a call and data communication. In some embodiments, the electronic device 100 uses eSIM, that is, an embedded SIM card. The eSIM card may be embedded in the electronic device 100 and cannot be separated from the electronic device 100.

Figure 8:
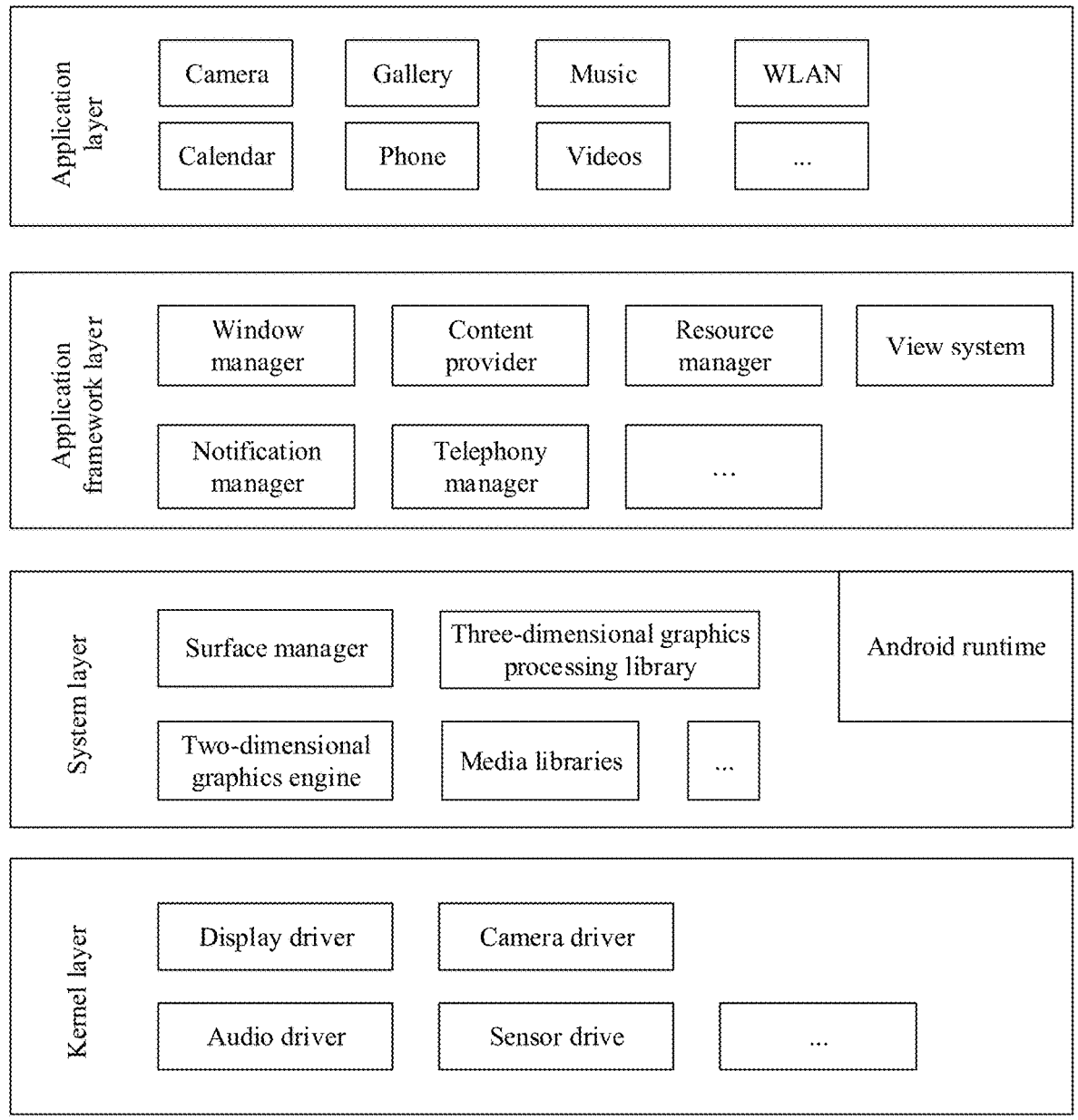
FIG. 8 is a schematic diagram of a software structure of an electronic device 100 according to an embodiment of this application.

FIG. 8 is a schematic diagram of a hardware structure of an electronic device 100 according to an embodiment of this application.

A layered architecture divides software into several layers, and each layer has a clear role and task. The layers communicate with each other by using a software interface. In some embodiments, a system is divided into four layers: an application layer, an application framework layer, runtime (Runtime) and system libraries, and a kernel layer from top to bottom.

The application layer may include a series of application program packages.

As shown in FIG. 8, the application packages may include applications such as camera, gallery, calendar, phone, maps, navigation, WLAN, Bluetooth, music, videos, and SMS messages.

The application framework layer provides an application programming interface (Application Programming Interface, API) and a programming framework for application programs at the application layer. The application framework layer includes some predefined functions.

As shown in FIG. 8, the application framework layer may include a window manager, a content provider, a view system, a telephony manager, a resource manager, a notification manager, and the like.

The window manager is configured to manage a window program. The window manager may obtain a size of a display, determine whether a status bar exists, lock a screen, take a screenshot, and the like.

The content provider is configured to store and obtain data, and enable these data to be accessible to an application. The data may include videos, images, audio, outgoing and incoming calls, browsing histories and bookmarks, phone books, and the like.

The view system includes visual controls such as a text display control and a picture display control. The view system may be configured to create an application program. A display interface may include one or more views. For example, a display interface including an SMS message notification icon may include a text display view and a picture display view.

The telephony manager is configured to provide a communications function for the electronic device 100, such as management of a call status (including connection, hanging up, and the like).

The resource manager provides various resources for application programs, such as localized strings, icons, pictures, layout files, and video files.

The notification manager enables application programs to display notification information in a status bar, may be configured to convey notification-type messages, and may automatically disappear after a short pause without user interaction. For example, the notification manager is used to notify download completion, a message alert, and the like. The notification manager may be alternatively a notification that appears on a top status bar of the system in a form of a graph or a scroll bar text, for example, a notification of an application program running in the background, or may be a notification that appears on the screen in a form of a dialog interface. For example, text information is prompted on a status bar, a prompt tone is made, the electronic device vibrates, or an indicator light flashes.

The runtime (Runtime) includes a core library and a virtual machine. The runtime is responsible for scheduling and managing a system.

The core library includes two parts: a performance function that programming language (for example, Java language) needs to invoke, and a core library of the system.

The application layer and the application framework layer run in a virtual machine. The virtual machine executes programming files (for example, Java files) at the application layer and the application framework layer as binary files. The virtual machine is configured to perform functions such as object lifecycle management, stack management, thread management, security and abnormality management, and garbage collection.

The system libraries may include a plurality of function modules, for example, a surface manager (Surface Manager), media libraries (Media Libraries), a three-dimensional graphics processing library (for example, OpenGL ES), and a two-dimensional graphics engine (for example, SGL).

The surface manager is configured to manage a display subsystem, and provide fusion of two dimensional (2-Dimensional, 2D) and three-dimensional (3-Dimensional, 3D) layers to a plurality of application programs.

The media libraries support playback and recording in a plurality of common audio and video formats, and also support still image files, and the like. The media libraries may support a plurality of audio and video encoding formats, such as MPEG4, H.264, MP3, AAC, AMR, JPG, and PNG.

The three-dimensional graphics processing library is configured to implement 3D graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a sensor driver, and a virtual card driver.

The following describes example working procedures of software and hardware of the electronic device 100 with reference to a capturing and photographing scenario.

When the touch sensor 180K receives a touch operation, a corresponding hardware interrupt is sent to the kernel layer. The kernel layer processes the touch operation into a raw input event (including information such as touch coordinates and a time stamp of the touch operation). The raw input event is stored at the kernel layer. The application framework layer obtains the raw input event from the kernel layer, and identifies a control corresponding to the input event. For example, the touch operation is a touch tap operation, and a control corresponding to the tap operation is a control of a camera application icon. A camera application invokes an interface of the application framework layer to start the camera application, so that the kernel layer is invoked to start a camera driver, and the camera 193 captures a still image or a video.

Some photographing scenarios provided by this application are described below.

FIG. 9A to FIG. 9D illustrate some example user interfaces used when the electronic device 100 is photographing.

The term "user interface" in the specification, claims, and accompanying drawings of this application is a media interface for an interaction and information exchange between an application program or an operating system and a user. The media interface implements an information conversion between an internal form and a form acceptable to the user. A common form of expression of the user interface is a graphic user interface (graphic user interface, GUI), which is a user interface that is displayed in a graphical manner and that is related to a computer operation. The graphic user interface may be an interface element such as an icon, a window, or a control that is displayed on a display of an electronic device. The control may include visible interface elements such as an icon, a button, a menu, a tab, a text box, a dialog box, a status bar, a navigation bar, and a widget.

Figure 9A:
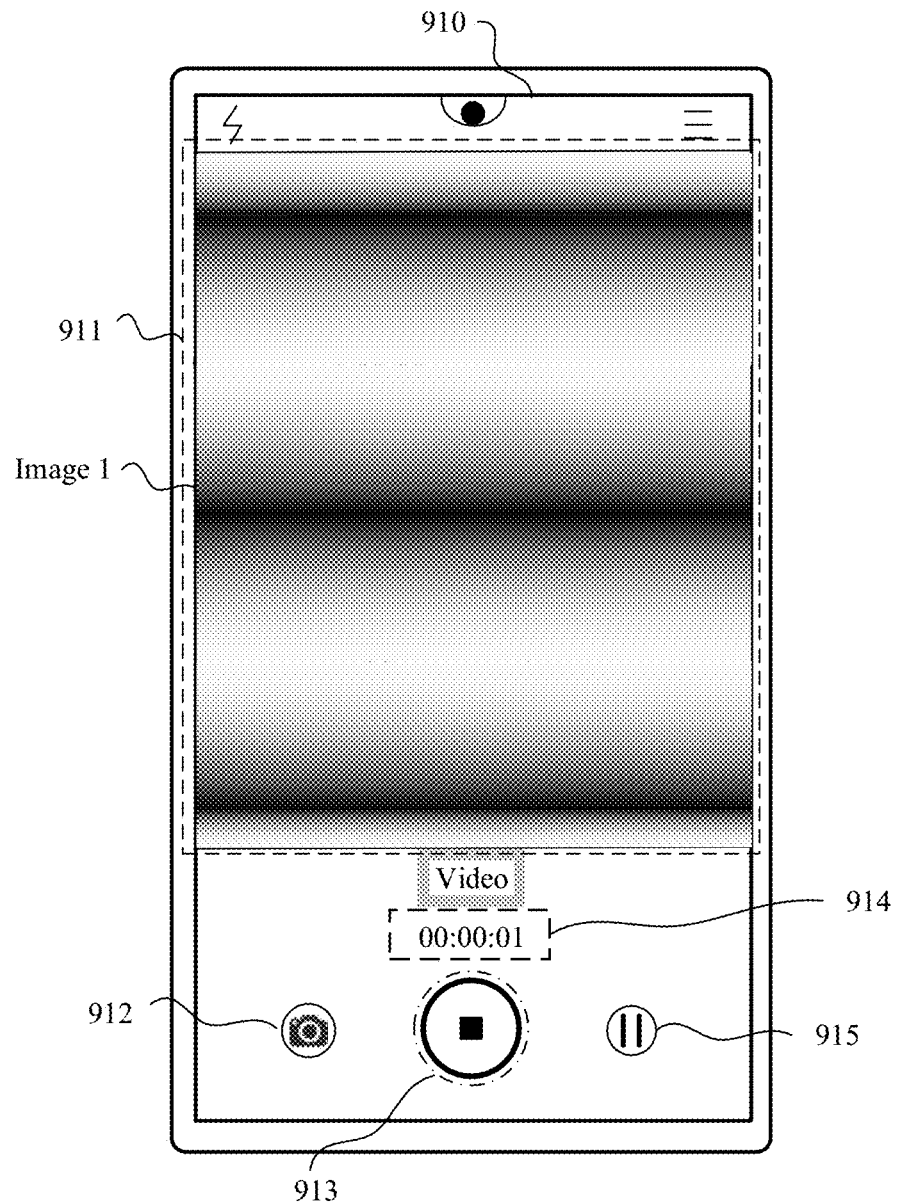
FIG. 9A to FIG. 9D are schematic diagrams of a group of user interfaces according to an embodiment of this application.

FIG. 9A illustrates an example user interface 910 on the electronic device 100. The user interface 910 displays a video interface, which may include a preview region 911, a shutter control 912, a video end control 913, a video time control 914, and a video pause control 915. Herein, the preview region 911 may be configured to display a preview image. The preview image is an image captured in real time by the electronic device 100 by using a camera. The electronic device may refresh, in real time, content displayed in the preview region 911, so that the user can preview an image captured by the camera currently. The shutter control 912 may be configured to trigger photographing, in other words, the user may trigger the shutter control 912 to take a photo during the recording. The video end control 913 may be configured to stop recording a video. The video time control 914 may indicate a length of time for a currently recorded video. The video pause control 915 may be configured to temporarily stop recording a video.

It may be understood that more or fewer controls may be included at the user interface 910, and this is not limited in the embodiments of this application.

As shown in FIG. 9A, 00:00:01 is displayed on the video time control 914, and indicates that the current video has been recorded for 1 second (s). In this case, the preview region 911 at the user interface 910 displays an image 1 with apparent bright and dark streaks.

Figure 9B:
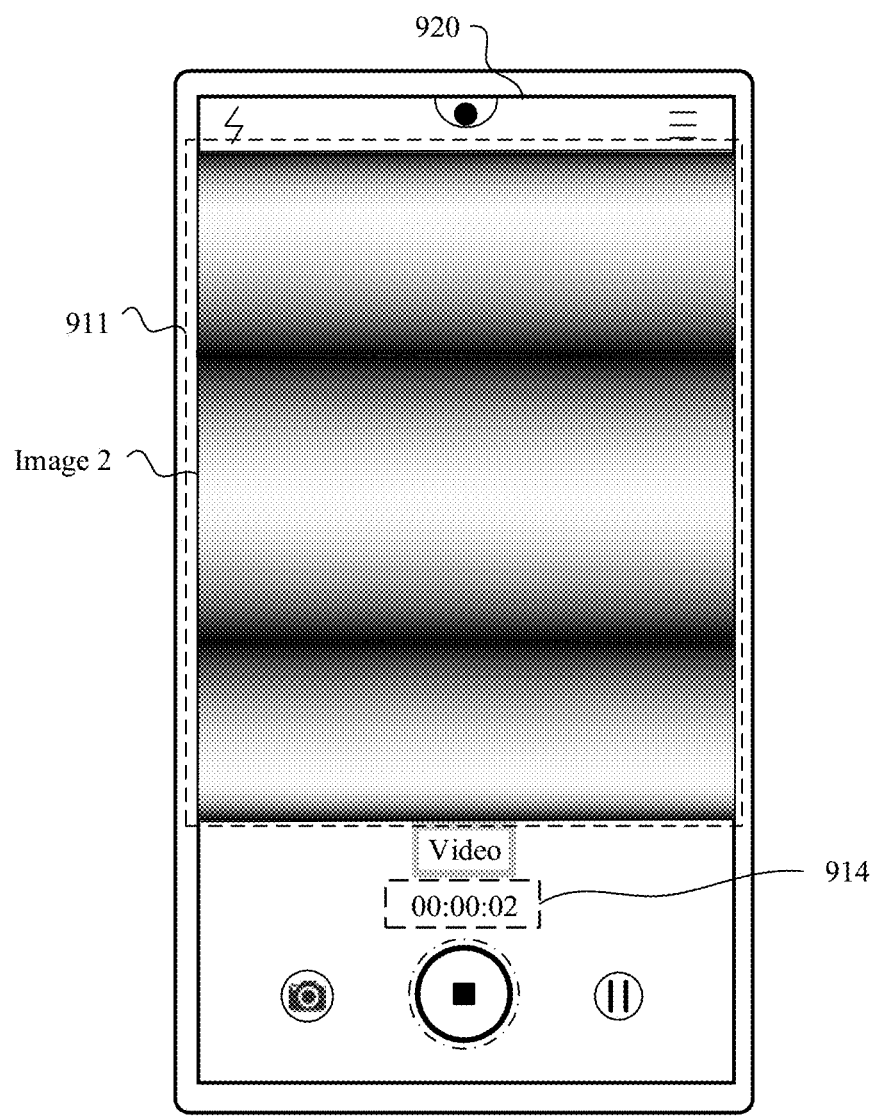

FIG. 9B illustrates an example user interface 920 on the electronic device 100. Controls at the user interface 920 are substantially the same as the controls at the user interface 910. As shown in FIG. 9B, 00:00:02 is displayed on the video time control 914, and indicates that the current video has been recorded for 2 seconds (s). In this case, the preview region 911 at the user interface 920 displays an image 2 with apparent bright and dark streaks. It may be understood that the bright and dark streaks in the two frames of images (the image 1 and the image 2) change in location. In other words, in the process of recording the $1^{st}$ second to the $2^{nd}$ second of the video, scrolling bright and dark streaks appear in the images in the preview region 911. The electronic device 100 may determine flicker frequencies of a plurality of artificial light sources, and select two of the artificial light sources with largest amplitudes. The flicker frequencies corresponding to the two artificial light sources are denoted as F1 and F2. Flicker periods corresponding to these two flicker frequencies are denoted as T1 and T2, respectively. If an exposure time is an integer multiple of T1 and a corresponding ISO is also within a preset range, the exposure time is adjusted to an integer multiple of T1, and a frame interval is adjusted based on F2. If the exposure time is an integer multiple of T1, and the corresponding ISO is not within the preset range, it is determined whether the electronic device can adjust the exposure time to an integer multiple of T2 when the ISO is within the preset range. If yes, the electronic device adjusts the exposure time to the integer multiple of T2, and adjusts the frame interval based on F1. Otherwise, the electronic device 100 does not adjust the exposure time, and adjusts only the frame interval based on F1.

Figure 9C:
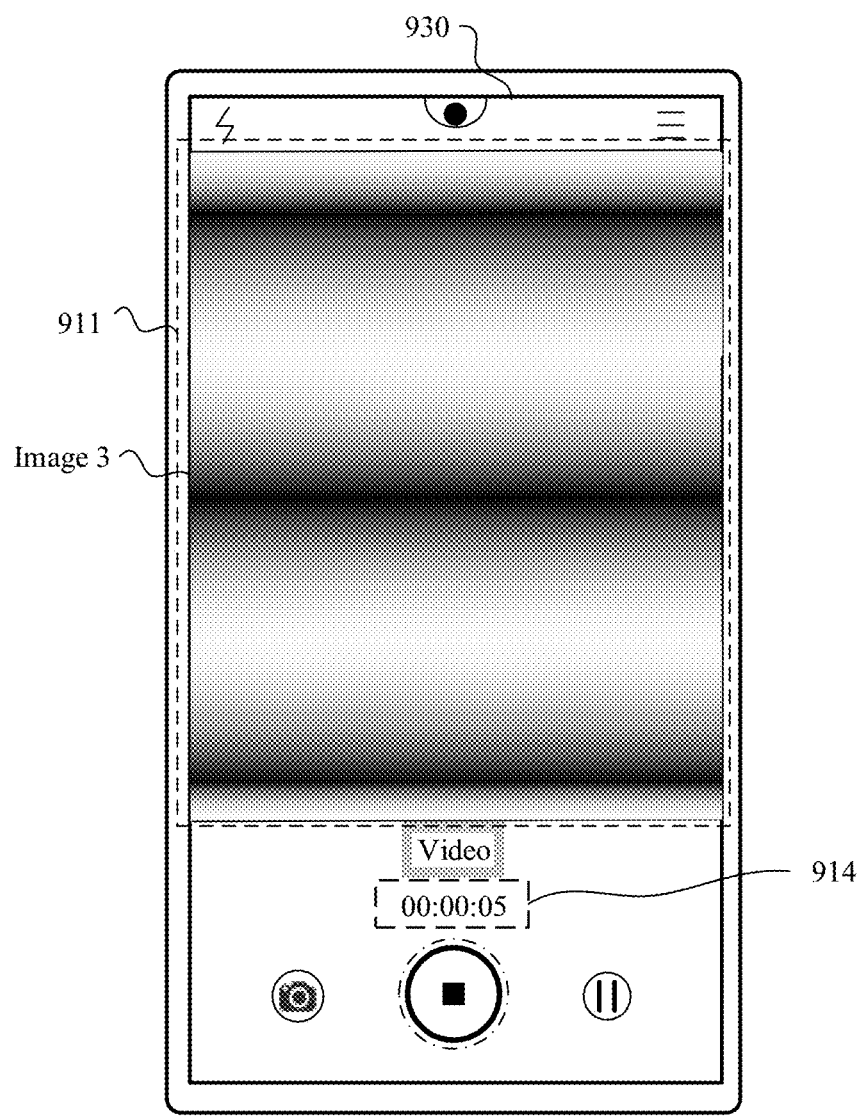
Figure 9D:
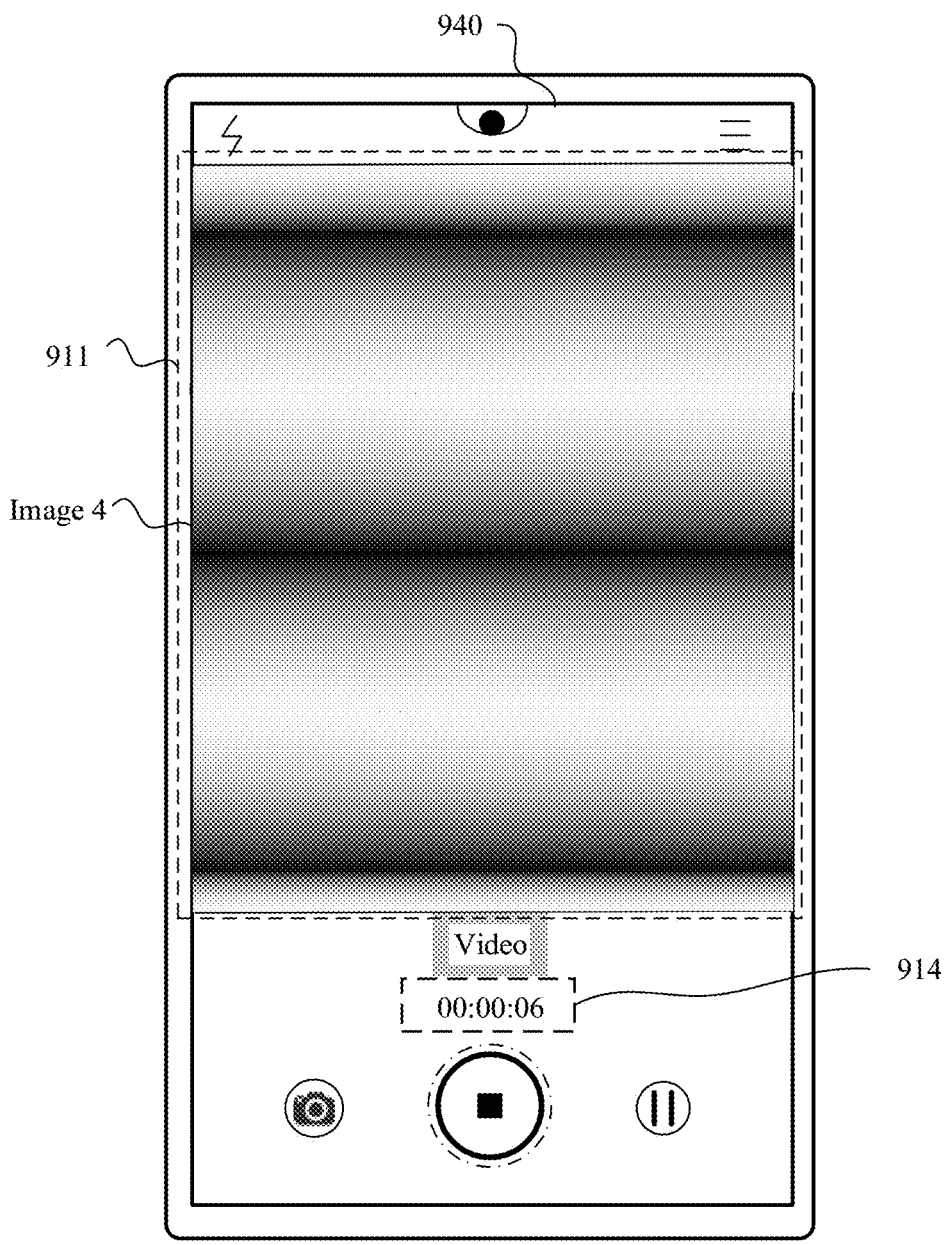

FIG. 9C and FIG. 9D illustrate some example user interfaces displayed on the electronic device 100 after performing the foregoing operations.

FIG. 9C illustrates an example user interface 930 on the electronic device 100. Controls at the user interface 930 are substantially the same as the controls at the user interface 910. As shown in FIG. 9C, 00:00:05 is displayed on the video time control 914, and indicates that the current video has been recorded for 5 seconds (s). In this case, the preview region 911 at the user interface 930 displays an image 3 with apparent bright and dark streaks.

FIG. 9D illustrates an example user interface 940 on the electronic device 100. Controls at the user interface 940 are substantially the same as the controls at the user interface 910. As shown in FIG. 9D, 00:00:06 is displayed on the video time control 914, and indicates that the current video has been recorded for 6 seconds (s). In this case, the preview region 911 at the user interface 940 displays an image 4 with apparent bright and dark streaks.

It may be understood that the bright and dark streaks in the two frames of images (the image 3 and the image 4) do not change in location. In other words, in the process of recording the $5^{th}$ second to the $6^{th}$ second of the video, the bright and dark streaks are fixed in the images in the preview region 911.

Therefore, after the electronic device 100 adjusts the exposure time and/or the frame interval according to the foregoing method, the bright and dark streaks can be fixed in the images, attenuating the banding phenomenon in the preview region 911 of the electronic device 100. In other words, no scrolling bright and dark streaks appear in the images on the electronic device 100, thereby improving photographing experience of a user.

The Following Describes in Detail a Method for Adjusting a Frame Interval Based on Flicker Frequencies of Artificial Light Sources when the Artificial Light Sources are Present in a Photographing Environment.

1. Obtain a Time Sequence of Ambient Brightness.

A fine photosensitive substance, that is, a pixel, is implanted on a photosensitive surface of a photosensitive sensor such as a charge coupled device (Charge Coupled Device, CCD) or a complementary metal-oxide semiconductor (Complementary Metal-Oxide Semiconductor, CMOS). The photosensitive sensor converts an optical image on each pixel on the photosensitive surface of the photosensitive sensor into an electrical signal.

Similar to the photosensitive sensor described above, a flicker sensor (Flicker Sensor) also converts an optical image on each pixel on a photosensitive surface into an electrical signal. However, the flicker sensor has only one pixel and is not light-filtered, so the electrical signal output by the flicker sensor is an electrical signal converted from an optical image on the only one pixel. It may be understood that the electrical signal output by the flicker sensor may be used to represent current ambient brightness. In other words, the electrical signal output by the flicker sensor can be considered as the current ambient brightness.

When a user triggers a photographing function of the electronic device 100, the flicker sensor in the electronic device 100 starts to sample an ambient light, and outputs a time for each sampling and a corresponding electrical signal. It may be understood that the flicker sensor outputs a time sequence (a first time sequence) of ambient brightness. It can be learned that the time sequence of ambient brightness is a one-dimensional time sequence. It may be understood that the first time sequence includes ambient brightness information and time information. The ambient brightness information mentioned herein is the ambient brightness mentioned above, that is, the ambient brightness of each sample. The time information mentioned herein is the time for each sampling mentioned above.

It may be understood that a sampling frequency of the flicker sensor may be set based on an actual requirement, and this is not limited in this application. For example, the sampling frequency of the flicker sensor is 2 kHz, that is, the flicker sensor performs sampling every 0.5 milliseconds (ms).

2. Determine Flicker Frequencies of a Plurality of Artificial Light Sources.

A spectrum can be obtained by performing a Fourier transform or a fast Fourier transform (fast Fourier transform, FFT) on the time sequence of the ambient brightness, to be specific, converting the time sequence of the ambient brightness from time domain to frequency domain. The spectrum is denoted as Spectrum1 (first spectrum). It may be understood that an abscissa of the spectrum is a frequency and an ordinate is an amplitude (an amplitude intensity of a signal). Herein, the amplitude represents brightness.

According to the Fourier principle, any continuously measured time sequence or signal can be expressed as an infinite superposition of sine wave signals at different frequencies. In the embodiment provided in this application, after converting the time sequence of ambient brightness to frequency domain, the obtained spectrum (Spectrum1) includes a plurality of sine waves. In the plurality of sine waves, a frequency corresponding to a sine wave with a largest amplitude is a frequency of an artificial light source. Other sine waves with smaller magnitudes are interference signals in the photographing environment. The following describes a method for determining flicker frequencies of a plurality of artificial light sources for example.

Specifically, the electronic device 100 determines a frequency of a first sine wave as a first flicker frequency and a frequency of a second sine wave as a second flicker frequency based on Spectrum1 (first spectrum). The electronic device determines a first flicker period based on the first flicker frequency and determines a second flicker period based on the second flicker frequency. A difference between an amplitude of the first sine wave and a first average is greater than a first preset threshold. A difference between an amplitude of the second sine wave and a second average is greater than a second preset threshold. The first average is an average of amplitudes of sine waves other than the first sine wave in a frequency search range for the first spectrum. The second average is an average of amplitudes of sine waves other than the first sine wave and the second sine wave in the frequency search range for the first spectrum. The frequency search range is used for determining a frequency range for searching the first sine wave and the second sine wave.

In some embodiments, the first sine wave corresponds to a first artificial light source and the second sine wave corresponds to a second artificial light source. It may be understood that an amplitude of the first sine wave is greater than an amplitude of the second sine wave. The amplitude in Spectrum1 represents brightness, which can be understood as a luminous intensity of an artificial light source. In other words, a luminous intensity of the first artificial light source is greater than a luminous intensity of the second artificial light source.

The electronic device 100 sets a frequency search range, for example, 20 Hz-2000 Hz. Within the frequency search range of the spectrum Spectrum1, a largest sine wave peak is selected and denoted as $A_1$, a frequency corresponding to the sine wave is denoted as $F_1$, and the sine wave corresponding to the sine wave peak is denoted as sine wave1. The electronic device 100 may also calculate an average of sine wave peaks of sine waves other than sine wave1 in the spectrum Spectrum1, and denote the average as $A_{avr1}$. The electronic device 100 calculates a difference between $A_1$ and $A_{avr1}$, and denotes the difference as $B_1$, that is, $B_1=A_1-A_{avr1}$. If $B_1$ is greater than the first preset threshold, the electronic device 100 determines that an artificial light source is present in the current photographing environment, and that the artificial light source has a flicker frequency of $F_1$; otherwise, the electronic device 100 determines that no artificial light source exists in the current photographing environment.

It may be understood that the electronic device 100 may also determine a flicker frequency of another artificial light source according to the method described above.

Similarly, within the frequency search range in the spectrum Spectrum1, a second largest sine wave peak is selected and denoted as $A_2$, a frequency corresponding to the sine wave is denoted as $F_2$, and the sine wave corresponding to the sine wave peak is denoted as sine wave2. The electronic device 100 may also calculate an average of sine wave peaks of sine waves other than sine wave1 and sine wave2 in the spectrum Spectrum1, and denote the average as $A_{avr2}$. The electronic device 100 calculates a difference between $A_2$ and $A_{avr2}$, and denotes the difference as $B_2$, that is, $B_2=A_2-A_{avr2}$. If $B_2$ is greater than the second preset threshold, the electronic device 100 determines that another artificial light source is present in the current photographing environment, and that the artificial light source has a flicker frequency of $F_2$; otherwise, the electronic device 100 determines that only the artificial light source with the flicker frequency $F_1$ is present in the current photographing environment.

It may be understood that the first preset threshold and the second preset threshold may be set based on an actual requirement, and this is not limited in this application. It should be noted that in some embodiments of this application, the flicker frequencies of the plurality of artificial light sources may be determined based on the same preset threshold. In other words, the first preset threshold and the second preset threshold may be the same or different.

Figure 10:
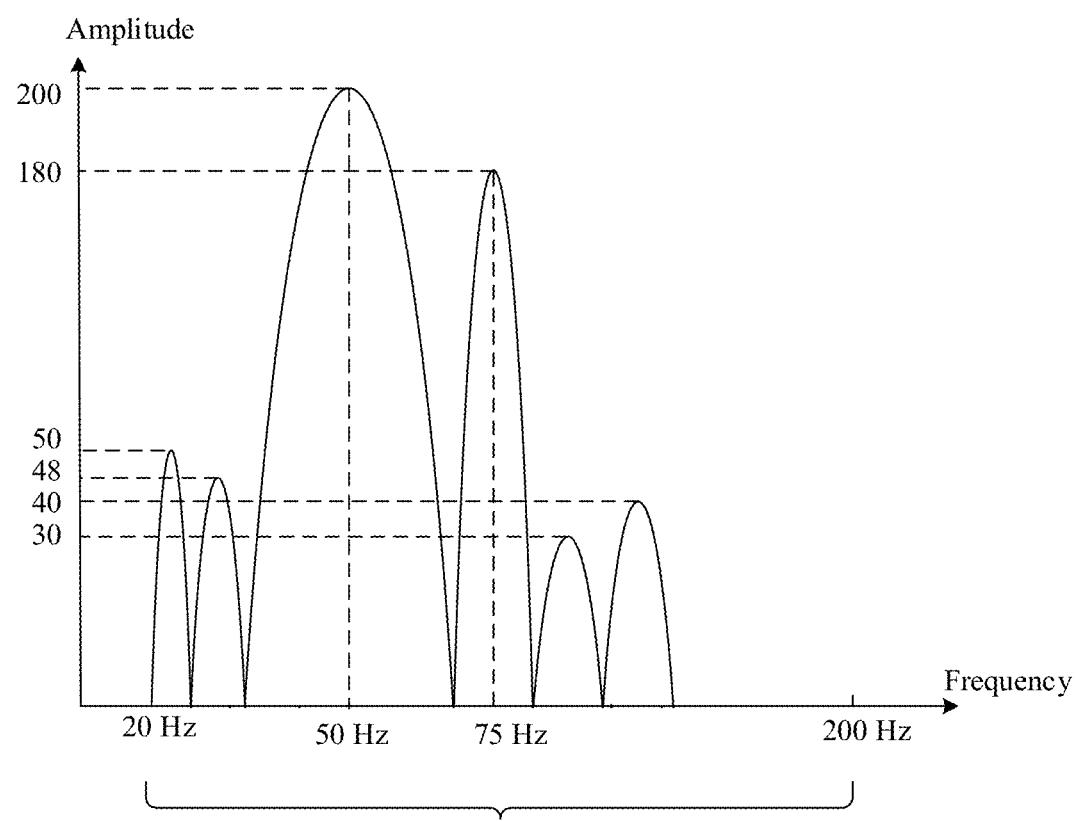
FIG. 10 is a spectrum diagram according to an embodiment of this application.

For example, both the first preset threshold and the second preset threshold are 100. FIG. 10 is a spectrum diagram according to an embodiment of this application. The electronic device sets a frequency search range, which is 20 Hz-200 Hz. A largest sine wave peak and a second largest sine wave peak in the 20 Hz-200 Hz range and their corresponding frequencies are searched for in the spectrum shown in FIG. 10. As can be seen, the largest sine wave peak is $A_1=200$, the frequency corresponding to the sine wave peak is $F_1=50$ Hz, the second largest sine wave peak is $A_2=180$, and the frequency corresponding to the sine wave peak is $F_2=75$ Hz. It can also be learned from FIG. 10 that $$A_{avr1} = \frac{(30+40+48+50+180)}{5} = 69.6,$$

$$\text{and } A_{avr2} = \frac{(30+40+48+50)}{4} = 42.$$

Therefore, a difference between $A_1$ and $A_{avr1}$ is $B_1=A_1-A_{avr1}=200-69.6=131.4$; and a difference between $A_2$ and $A_{avr2}$ is $B_2=A_2-A_{avr2}=180-42=138$. Obviously, $B_1$ is greater than the first preset threshold, and $B_2$ is greater than the second preset threshold, so that the electronic device 100 determines that two artificial light sources are present in the current photographing environment, and that flicker frequencies of the two artificial light sources are 50 Hz and 75 Hz.

It should be noted that, on the basis of the foregoing content, it is also possible to determine, based on other sine wave peaks, whether an artificial light source at another frequency is present. For the determining method, reference may be made to the foregoing content, and details are not described herein.

3. Determine a Frame Interval Based on the Frequencies of the Artificial Light Sources.

When a flicker is present in the ambient light source, the banding phenomenon needs to be attenuated. The electronic device 100 may set the frame interval to an integer multiple of the flicker period, so that an initial phase used when the sensor starts to expose first rows of pixels in different images remains unchanged, and a magnitude relationship between light energy received in different rows of pixels in each frame of image remains unchanged.

It may be understood that the frame interval is an interval for the sensor to expose an image. A time at which the first row of pixels in a frame of image starts exposure is denoted as ET1, a time at which the first row of pixels in a frame of image following the frame of image starts exposure is denoted as ET2, and the frame interval is ET2-ET1.

If light energy received by different rows of pixels in a same frame of image is sorted in ascending or descending order, the sorting is denoted as X. X may be viewed as a two-dimensional array including sequence numbers of the permutations and corresponding row numbers. For example, $\{(1, M_1), (2, M_2), (3, M_3), \ldots, (N, M_N)\}$, where 1 to N indicate sequence numbers arranged in ascending or descending order, and $M_1$ to $M_N$ indicate pixel row numbers corresponding to the foregoing sequence numbers. Although the $N^{th}$ rows of pixels in different images may receive different amounts of light energy, X remains unchanged for different images.

It may be understood that the amounts of light energy received by different rows of pixels in an image may be reflected by brightness of the different rows of pixels in the image. In other words, the $N^{th}$ row in each frame of image may be different from each other in brightness, but remain unchanged in brightness relative to other rows in the same image. In other words, after the electronic device 100 sets the frame interval to an integer multiple of the flicker period, the bright and dark streaks can no longer scroll. Thus, impact of the banding phenomenon on the image brightness is attenuated.

In one embodiment of this application, the frame interval may be set according to Table 1.

TABLE 1

| | Flicker frequency | | | | | |
|---|---|---|---|---|---|---|
| | 60 Hz | 80 Hz | 90 Hz | 100 Hz | 120 Hz | 150 Hz |
| Frame interval | 33 ms | 37 ms | 33 ms | 30 ms | 33 ms | 33 ms |

The frame interval is determined according to Table 1, thereby not only attenuating the banding phenomenon, to be specific, when an artificial light source is present in the photographing environment, the bright and dark streaks appearing on the display of the electronic device 100 do not scroll, but also meeting a playback requirement of 30 FPS, to be specific, 30 frames of images are transmitted per second.

In some embodiments of this application, the electronic device 100 may adjust the exposure time and the frame interval based on frequencies corresponding to two sine waves with largest amplitudes. As can be learned from the above, the ordinate in the spectrum represents an amplitude and the amplitude represents brightness. It may be understood that an artificial light source with high brightness in the photographing environment has a great impact on the banding phenomenon. Therefore, when two or more artificial light sources are present in the photographing environment, the electronic apparatus 100 may select artificial light sources with a largest amplitude and a second largest amplitude, and adjust an exposure time and a frame interval based on frequencies of the two artificial light sources.

Figure 11A:
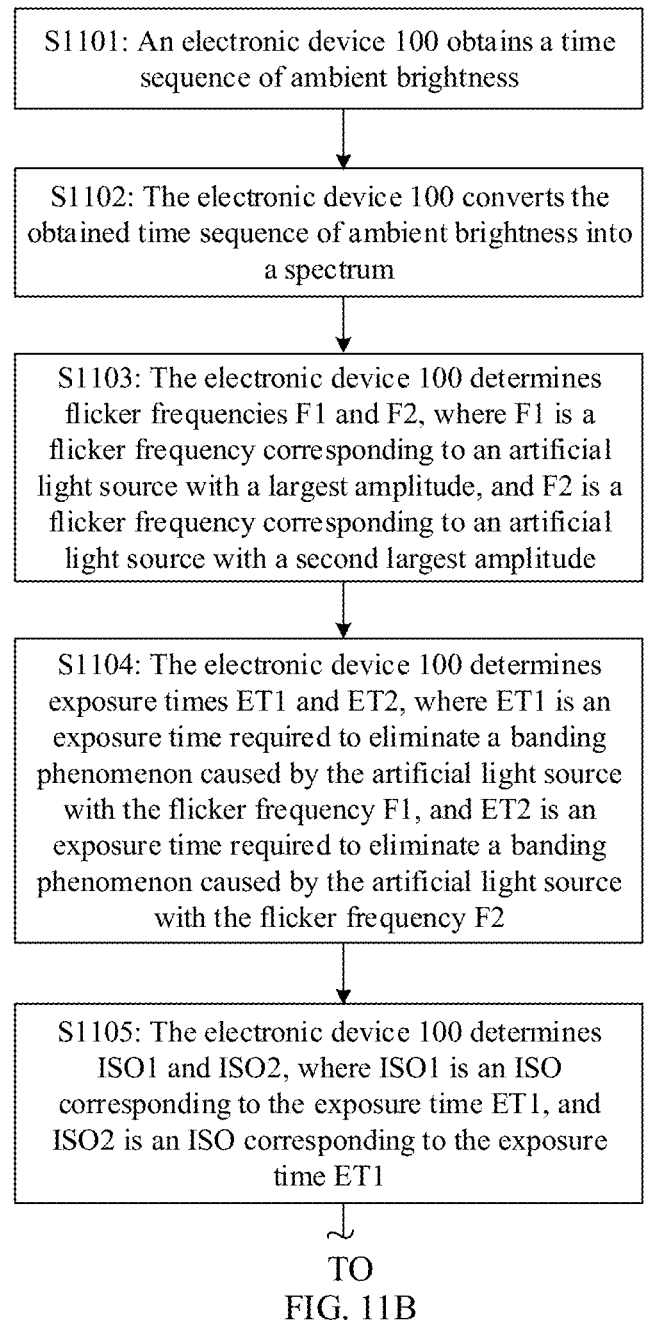
FIG. 11A and FIG. 11B are a flowchart of a photographing method from a plurality of artificial light sources according to an embodiment of this application.
Figure 11B:
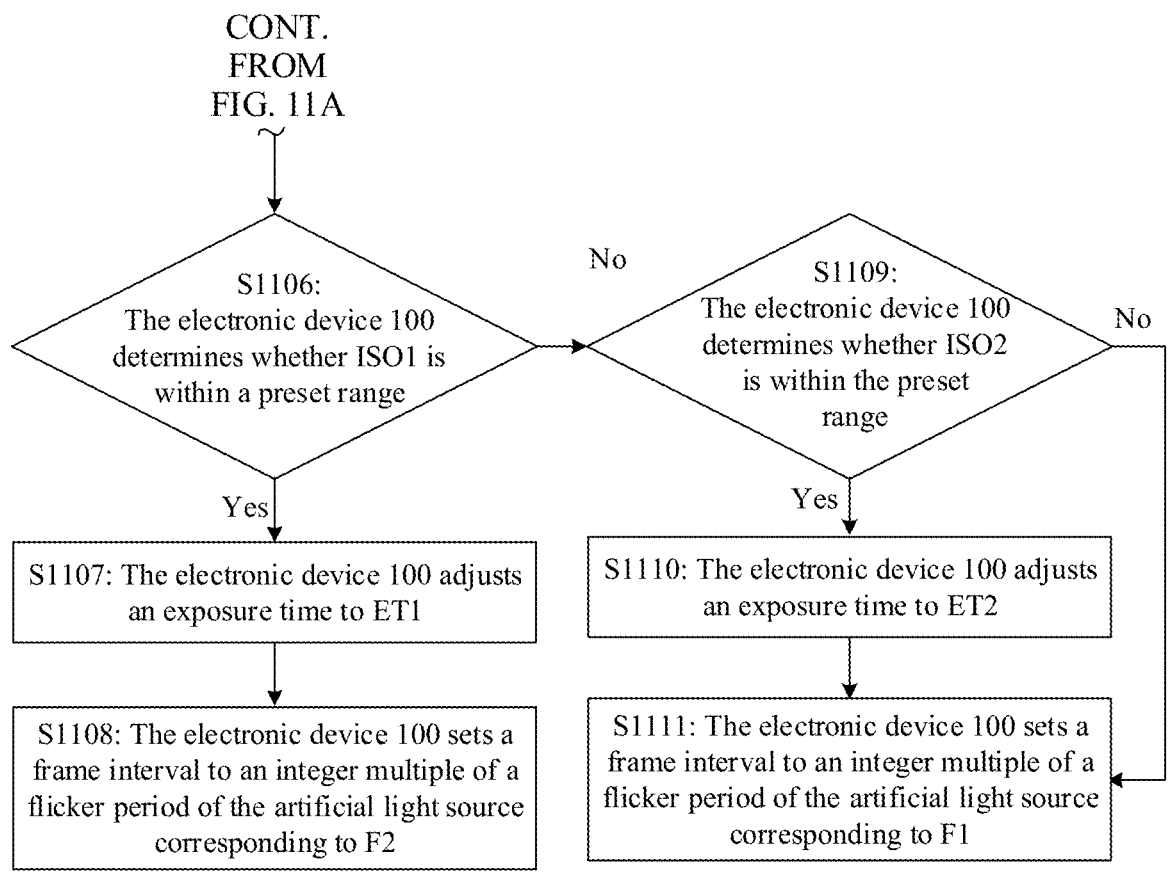

The Following Describes in Detail a Photographing Method from a Plurality of Artificial Light Sources According to an Embodiment of this Application in Conjunction with FIG. 11A and FIG. 11B.

It should be noted that the photographing method from a plurality of artificial light sources shown in FIG. 11A and FIG. 11B can be applied to a scenario in which artificial light sources with two flicker frequencies are present in the photographing environment (as shown in FIG. 6).

S1101: The electronic device 100 obtains a time sequence of ambient brightness.

It may be understood that the electronic device 100 may obtain the time sequence of ambient brightness by using a flicker sensor or other similar sensors. The method for obtaining the time sequence of ambient brightness has been described in the foregoing embodiments, and details are not described herein again.

S1102: The electronic device 100 converts the obtained time sequence of ambient brightness into a spectrum.

It may be understood that the electronic device 100 may convert the time sequence of ambient brightness from time domain to frequency domain by using a Fourier transform or a fast Fourier transform, to obtain a spectrum.

S1103: The electronic device 100 determines flicker frequencies $F_1$ and $F_2$. Herein, $F_1$ is a flicker frequency corresponding to an artificial light source with a largest amplitude, and $F_2$ is a flicker frequency corresponding to an artificial light source with a second largest amplitude.

It may be understood that the electronic device 100 may determine flicker frequencies of a plurality of artificial light sources in the current photographing environment. For a specific method, reference may be made to the foregoing embodiments, and details are not described herein again.

In one embodiment of this application, within a frequency search range in spectrum Spectrum1, frequencies corresponding to the largest and second largest sine wave peaks are the flicker frequencies of the artificial light sources in the current photographing environment. In other words, the electronic device 100 may determine that artificial light sources with two flicker frequencies are present in the current photographing environment. These two flicker frequencies are denoted as $F_1$ and $F_2$. Herein, $F_1$ is the frequency corresponding to the largest sine wave peak, and $F_2$ is the frequency corresponding to the second largest sine wave peak. For example, $F_1$=100 Hz and $F_2$=120 Hz.

S1104: The electronic device 100 determines exposure times ET1 and ET2. Herein, ET1 is an exposure time required to eliminate the banding phenomenon caused by the artificial light source with the flicker frequency $F_1$, and ET2 is an exposure time required to eliminate the banding phenomenon caused by the artificial light source with the flicker frequency $F_2$.

Because 1 is the product of a flicker period and a flicker frequency, the electronic device 100 may determine flicker periods of the plurality of artificial light sources based on the flicker frequencies of the plurality of artificial light sources determined in step S1102. If the exposure time is an integer multiple of the flicker period of the artificial light source, the artificial light source corresponding to the flicker period does not cause the banding phenomenon.

Specifically, flicker periods corresponding to the artificial light sources with the flicker frequencies $F_1$ and $F_2$ are denoted as t1 and t2, respectively. Herein, $t1=1/F_1$, and $t2=1/F_2$. If the exposure time is ET1=M*t1 (M is a positive integer), the artificial light source with the flicker frequency $F_1$ does not cause the banding phenomenon. If the exposure time is ET2=M*t2 (M is a positive integer), the artificial light source with the flicker frequency $F_2$ does not cause the banding phenomenon. In other words, ET1 is an exposure time required to eliminate the banding phenomenon caused by the artificial light source with the flicker frequency $F_1$, and ET2 is an exposure time required to eliminate the banding phenomenon caused by the artificial light source with the flicker frequency $F_2$.

For example, $F_1$=100Hz and $F_2$=120 Hz. Therefore, $$t1 = 1/F_1 = \frac{1}{100} = 10 \text{ ms and } t2 = 1/F_2 = \frac{1}{120} = 8.3 \text{ ms.}$$

It may be understood that if the exposure time is ET1=M*t1=10M milliseconds (M is a positive integer), the artificial light source with the flicker frequency 100 Hz does not cause the banding phenomenon. If the exposure time is ET2=M*t2=8.3M milliseconds (M is a positive integer), the artificial light source with the flicker frequency 120 Hz does not cause the banding phenomenon.

S1105: The electronic device 100 determines ISO1 and ISO2. Herein, ISO1 is an ISO corresponding to the exposure time ET1, and ISO2 is an ISO corresponding to the exposure time ET2.

Specifically, if an exposure intensity remains unchanged, the electronic device 100 may determine ISOs (that is, ISO1 and ISO2) corresponding to the exposure times ET1 and ET2 according to a relationship among an exposure intensity, an exposure time, and an ISO (Exposure intensity=Exposure time*ISO). In one embodiment of this application, the electronic device 100 may determine ISO1 and ISO2 based on the exposure intensity used to obtain the latest frame of image. In other words, Exposure intensity used by the electronic device 100 to obtain the latest frame of image=ET1*ISO1=ET2*ISO2.

For example, the exposure intensity used by the electronic device 100 to obtain the latest frame of image is 10. Therefore, ISO1=10/ET1=1000, and ISO2=10/ET2=1200.

It may be understood that the electronic device 100 may determine the exposure intensity based on the exposure time for obtaining the latest frame of image and the corresponding ISO. The exposure time used by the electronic device to obtain the latest frame of image and the ISO may be read from a sensor, or when exposure parameters such as the exposure time and the ISO are stored at a specified memory address, the electronic device 100 may obtain the exposure time and the ISO by accessing the specified memory address.

S1106: The electronic device 100 determines whether ISO1 is within a preset range.

According to the foregoing description, the ISO represents an amplification gain of an electronic signal. Increasing ISO not only amplifies a wanted signal but also amplifies noise. Therefore, a higher ISO indicates a larger quantity of noise in the image obtained by the electronic device 100 and poorer quality of the image. Therefore, in an actual photographing process, a reasonable range usually needs to be set for the ISO so that the wanted signal is amplified while the amplified noise is also within the noise reduction capability range of the electronic device 100.

In this application, the electronic device 100 may set a preset range to determine whether the ISO used by the electronic device 100 is within an appropriate range. For example, the electronic device 100 sets a preset range: $ISO_{min} \leq ISO \leq ISO_{max}$. Herein, $ISO_{min}$ is a minimum ISO value that can be used by the electronic device 100, and $ISO_{max}$ is a maximum ISO value that can be used by the electronic device 100. Certainly, the preset range used by the electronic device 100 may be in other forms, and this is not limited in this application.

Specifically, the electronic device 100 determines whether ISO1 is within the preset range. If ISO1 is within the preset range, the electronic device 100 adjusts the exposure time to ET1 (step S1107). If ISO1 is not within the preset range, the electronic device 100 determines whether ISO2 is within the preset range (step S1109).

For example, $ISO_{min}$=400 and $ISO_{max}$=1000. Therefore, 400≤ISO1≤1000. That is, ISO1 is within the preset range.

S1107: The electronic device 100 adjusts the exposure time to ET1.

It may be understood that if ISO1 is within the preset range, the electronic device 100 may adjust the exposure time to ET1.

S1108: The electronic device 100 sets the frame interval to an integer multiple of a flicker period of an artificial light source corresponding to $F_2$.

It may be understood that the electronic device 100 may set the frame interval to the integer multiple of the flicker period of the artificial light source corresponding to $F_2$, that is, the frame interval is set to an integer multiple of t2. The method for setting the frame interval has been described in the foregoing embodiments, and details are not described herein again.

The embodiment of this application does not limit an execution order between step S1107 and step S1108. In some embodiments, the electronic device 100 may first adjust the frame interval based on the flicker frequency $F_2$. After adjusting the frame interval, the electronic device 100 may further adjust the exposure time to ET1. Alternatively, the electronic device 100 may simultaneously adjust the exposure time and the frame interval.

For example, $F_2$=120 Hz, and according to Table 1, the frame interval may be set to 33 ms.

S1109: The electronic device 100 determines whether ISO2 is within the preset range.

Specifically, the electronic device 100 determines whether ISO2 is within the preset range. If ISO2 is within the preset range, the electronic device 100 adjusts the exposure time to ET2 (step S1110). If ISO2 is not within the preset range, the electronic device 100 adjusts the frame interval based on the flicker frequency $F_1$ (step S1111).

It may be understood that for related descriptions of determining whether ISO2 is within the preset range, reference may be made to step S1106 and details are not described herein again.

For example, $ISO_{min}$=400 and $ISO_{max}$=1000. Therefore, ISO2>1000. That is, ISO2 is not within the preset range.

S1110: The electronic device 100 adjusts the exposure time to ET2.

It may be understood that if ISO1 is not within the preset range and ISO2 is within the preset range, the electronic device 100 may adjust the exposure time to ET2.

S1111: The electronic device 100 sets the frame interval to an integer multiple of a flicker period of an artificial light source corresponding to $F_1$.

It may be understood that the electronic device 100 may set the frame interval to the integer multiple of the flicker period of the artificial light source corresponding to $F_1$, that is, the frame interval is set to an integer multiple of t1. The method for setting the frame interval has been described in the foregoing embodiments, and details are not described herein again.

The embodiment of this application does not limit an execution order between step S1110 and step S1111. In some embodiments, the electronic device 100 may first adjust the frame interval based on the flicker frequency $F_1$. After adjusting the frame interval, the electronic device 100 may further adjust the exposure time to ET2. Alternatively, the electronic device 100 may simultaneously adjust the exposure time and the frame interval.

For example, $F_1$=100 Hz, and according to Table 1, the frame interval may be set to 30 ms.

It should be noted that the electronic device 100 may denote an exposure time and a frame interval, used to capture an image after execution of the foregoing method, as a first exposure time and a first frame interval. The electronic device 100 may usually use the adjusted exposure time and frame interval for photographing. To be specific, an interval used by the electronic device 100 to capture an adjacent image subsequently is the adjusted frame interval (first frame interval). An exposure time used by the electronic device 100 to capture an image subsequently is an exposure time (first exposure time) adjusted according to the foregoing method. It may be understood that a quantity of images captured by the electronic device using the adjusted exposure time is not necessarily 1, and this is not limited in this application.

In some embodiments of this application, the electronic device may directly determine whether ET1 and ET2 are within the first range without determining whether ISO1 and ISO2 are within the preset range. It may be understood that the first range may be set based on an actual requirement, and this is not limited in this application.

In some embodiments of this application, the electronic device 100 may first adjust an order of determining whether ISO1 and ISO2 are within the preset range. In other words, the electronic device 100 may first determine whether ISO2 is within the preset range, that is, the electronic device 100 may first perform step S1109 and then perform step S1106.

In some embodiments of this application, the electronic device 100 may simultaneously determine whether ISO1 and ISO2 are within the preset range, and then perform subsequent steps based on a determining result.

In some embodiments of this application, artificial light sources with two or more flicker frequencies are present, and the electronic device 100 may select an artificial light source with a largest amplitude and an artificial light source with a second largest amplitude, and perform the method shown in FIG. 11A and FIG. 11B. In other words, the electronic device 100 may select the artificial light source with the largest luminous intensity and the artificial light source with the second largest luminous intensity, and perform the method shown in FIG. 11A and FIG. 11B. If neither ISO1 nor ISO2 is within the preset range, the electronic device 100 may select an artificial light source with a third largest amplitude, and may determine the corresponding ET3 and ISO3 with reference to step S1104 and step S1105. The electronic device 100 may also determine whether ISO3 is within the preset range (step S1106 and step S1109). If ISO3 is within the preset range, the electronic device 100 adjusts the exposure time to ET1. If ISO3 is not within the preset range, the electronic device 100 may select an artificial light source with a fourth largest amplitude and perform the foregoing steps. By analogy, if artificial light sources with N flicker frequencies are present in the photographing environment, the electronic apparatus 100 may sequentially determine the corresponding exposure times and the ISOs based on the order of magnitudes of the artificial light sources, determine whether the ISOs are within the preset range, and then adjust the exposure time and the frame interval based on determining results.

In some embodiments of this application, artificial light sources with two or more flicker frequencies are present, and the electronic device 100 may directly use the photographing method shown in FIG. 11A and FIG. 11B. In other words, the electronic device 100 may determine flicker frequencies of artificial light sources with the largest amplitude and the second largest amplitude, and determine the exposure time and the frame interval based on the flicker frequencies. Because an artificial light source with a large amplitude has a great impact on the banding phenomenon, if the banding phenomenon caused by the artificial light source with a large amplitude can be eliminated, the impact of the banding phenomenon on photographing can be greatly reduced.

For example, if a third artificial light source is present in the photographing environment, the electronic device 100 may determine a third flicker period; where the third flicker period is a flicker period of the third artificial light source; and if k1 times the first flicker period exceeds the first range, k2 times the second flicker period does not exceed the first range, and k3 times the third flicker period does not exceed the first range, the first exposure time is k3 times the third flicker period, and the first frame interval is k1 times the first flicker period.

In some embodiments of this application, artificial light sources with two or more flicker frequencies are present, and the electronic device 100 may also determine flicker frequencies of any two of the artificial light sources, and determine the exposure time and the frame interval based on the two flicker frequencies (refer to the method shown in FIG. 11A and FIG. 11B).

It may be understood that when t1 is the first flicker period, t2 is the second flicker period. Alternatively, when t1 is the second flicker period, t2 is the first flicker period. Similarly, ET1 and ET2 may be ET1=k1*t1 (k1 is a positive integer) and ET2=k2*t2 (k2 is a positive integer), respectively. Alternatively, ET1 and ET2 may be ET1=k2*t1 (k2 is a positive integer) and ET2=k1*t2 (k1 is a positive integer), respectively.

It should be noted that the electronic device mentioned in the claims may be the electronic device 100 in the embodiments of this application.

As discussed above, the foregoing embodiments are merely intended for describing the technical solutions of this application, but not for limiting this application. Although this application is described in detail with reference to the foregoing embodiments, a person of ordinary skill in the art is to understand that they may still make modifications to the technical solutions described in the foregoing embodiments or make equivalent replacements to some technical features thereof, without departing from the scope of the technical solutions of the embodiments of this application.

What is claimed is:

1. A photographing method from a plurality of artificial light sources, comprising:
    determining, by an electronic device, a first flicker period and a second flicker period; wherein the first flicker period is a flicker period of a first artificial light source in a photographing environment, and the second flicker period is a flicker period of a second artificial light source in the photographing environment;
    determining, by the electronic device, a first exposure time and a first frame interval; wherein when k1 times the first flicker period does not exceed a first range, the first exposure time is determined as k1 times the first flicker period, and the first frame interval is determined as k2 times the second flicker period; wherein both k1 and k2 are positive integers, and wherein when k1 times the first flicker period exceeds the first range, and k2 times the second flicker period does not exceed the first range, the first exposure time is determined as k2 times the second flicker period; and
    photographing, by the electronic device, by using the first exposure time and the first frame interval, wherein the first frame interval is an interval between two adjacent frames of images captured by a camera.

2. The method according to claim 1, wherein a luminous intensity of the first artificial light source is greater than a luminous intensity of the second artificial light source.

3. The method according to claim 1, wherein
    when k1 times the first flicker period exceeds the first range, and k2 times the second flicker period does not exceed the first range, the first frame interval is determined as k1 times the first flicker period.

4. The method according to claim 1, wherein
    when k1 times the first flicker period exceeds the first range, and k2 times the second flicker period also exceeds the first range, the first frame interval is determined as k1 times the first flicker period.

5. The method according to claim 1, wherein the determining, by the electronic device, the first flicker period and the second flicker period specifically comprises:
    obtaining, by the electronic device, a first time sequence; wherein the first time sequence comprises ambient brightness information and time information;
    converting, by the electronic device, the first time sequence into a first spectrum;
    determining, by the electronic device, a frequency of a first sine wave as a first flicker frequency and a frequency of a second sine wave as a second flicker frequency based on the first spectrum; and
    determining, by the electronic device, the first flicker period based on the first flicker frequency, and determining the second flicker period based on the second flicker frequency.

6. The method according to claim 5, wherein a difference between an amplitude of the first sine wave and a first average is greater than a first preset threshold; a difference between an amplitude of the second sine wave and a second average is greater than a second preset threshold; the first average is an average of amplitudes of sine waves other than the first sine wave within a frequency search range for the first spectrum; the second average is an average of amplitudes of sine waves other than the first sine wave and the second sine wave within the frequency search range for the first spectrum; and the frequency search range is used for determining a frequency range for searching the first sine wave and the second sine wave.

7. The method according to claim 6, wherein a third artificial light source is present in the photographing environment, and the method further comprises:
    determining, by the electronic device, a third flicker period; wherein the third flicker period is a flicker period of the third artificial light source; wherein when k1 times the first flicker period exceeds the first range, and when k2 times the second flicker period does not exceed the first range, and when k3 times the third flicker period does not exceed the first range, the first exposure time is determined as k3 times the third flicker period, and the first frame interval is determined as k1 times the first flicker period.

8. The method according to claim 1, wherein two or more artificial light sources are present in the photographing environment; the first artificial light source is an artificial light source with a largest luminous intensity among the two or more artificial light sources; and the second artificial light source is an artificial light source with a second largest luminous intensity among the two or more artificial light sources.

9. The method according to claim 1, wherein a third artificial light source is present in the photographing environment, and the method further comprises:
    determining, by the electronic device, a third flicker period; wherein the third flicker period is a flicker period of the third artificial light source; wherein
    when k1 times the first flicker period exceeds the first range, and when k2 times the second flicker period does not exceed the first range, and when k3 times the third flicker period does not exceed the first range, the first exposure time is determined as k3 times the third flicker period, and the first frame interval is determined as k1 times the first flicker period.

10. An electronic device, comprising a camera, one or more memories that are non-transitory, and one or more processors, wherein the one or more processors are coupled to the camera and the one or more memories, and the one or more memories are configured to store computer program code that is executed by the one or more processors to cause the electronic device to perform operations comprising:
    determining a first flicker period and a second flicker period; wherein the first flicker period is a flicker period of a first artificial light source in a photographing environment, and the second flicker period is a flicker period of a second artificial light source in the photographing environment;
    determining a first exposure time and a first frame interval; wherein when k1 times the first flicker period does not exceed a first range, the first exposure time is determined as k1 times the first flicker period, and the first frame interval is determined as k2 times the second flicker period, wherein both k1 and k2 are positive integers, and when k1 times the first flicker period exceeds the first range, and k2 times the second flicker period also exceeds the first range, the first frame interval is determined as k1 times the first flicker period; and
    photographing, by using the first exposure time and the first frame interval, wherein the first frame interval is an interval between capturing two adjacent frames of images.

11. The electronic device according to claim 10, wherein a luminous intensity of the first artificial light source is greater than a luminous intensity of the second artificial light source.

12. The electronic device according to claim 10, wherein when k1 times the first flicker period exceeds the first range, and when k2 times the second flicker period does not exceed the first range, the first exposure time is determined as k2 times the second flicker period, and the first frame interval is determined as k1 times the first flicker period.

13. The electronic device according to claim 10, wherein determining the first flicker period and the second flicker period, comprises to:
obtain a first time sequence, wherein the first time sequence comprises ambient brightness information and time information;
convert the first time sequence into a first spectrum;
determine a frequency of a first sine wave as a first flicker frequency and a frequency of a second sine wave as a second flicker frequency based on the first spectrum; and
determine the first flicker period based on the first flicker frequency, and determine the second flicker period based on the second flicker frequency.

14. The electronic device according to claim 13, wherein a difference between an amplitude of the first sine wave and a first average is greater than a first preset threshold; a difference between an amplitude of the second sine wave and a second average is greater than a second preset threshold; the first average is an average of amplitudes of sine waves other than the first sine wave within a frequency search range for the first spectrum; the second average is an average of amplitudes of sine waves other than the first sine wave and the second sine wave within the frequency search range for the first spectrum; and the frequency search range is used for determining a frequency range for searching the first sine wave and the second sine wave.

15. The electronic device according to claim 14, wherein a third artificial light source is present in the photographing environment; and the operations further comprise to determine a third flicker period; wherein the third flicker period is a flicker period of the third artificial light source; wherein when k1 times the first flicker period exceeds the first range, and when k2 times the second flicker period does not exceed the first range, and when k3 times the third flicker period does not exceed the first range, the first exposure time is determined as k3 times the third flicker period, and the first frame interval is determined as k1 times the first flicker period.

16. The electronic device according to claim 10, wherein two or more artificial light sources are present in the photographing environment; the first artificial light source is an artificial light source with a largest luminous intensity among the two or more artificial light sources; and the second artificial light source is an artificial light source with a second largest luminous intensity among the two or more artificial light sources.

17. The electronic device according to claim 10, wherein a third artificial light source is present in the photographing environment; and the operations further comprise to determine a third flicker period, wherein the third flicker period is a flicker period of the third artificial light source; wherein when k1 times the first flicker period exceeds the first range, and when k2 times the second flicker period does not exceed the first range, and when k3 times the third flicker period does not exceed the first range, the first exposure time is determined as k3 times the third flicker period, and the first frame interval is determined as k1 times the first flicker period.

18. A non-statutory computer-readable storage medium, comprising computer instructions, wherein when the computer instructions are run on an electronic device, the electronic device is enabled to perform operations comprising:
determining, by an electronic device, a first flicker period and a second flicker period; wherein the first flicker period is a flicker period of a first artificial light source in a photographing environment, and the second flicker period is a flicker period of a second artificial light source in the photographing environment;
determining, by the electronic device, a first exposure time and a first frame interval; wherein when k1 times the first flicker period does not exceed a first range, the first exposure time is k1 times the first flicker period, and the first frame interval is k2 times the second flicker period, wherein both k1 and k2 are positive integers;
photographing, by the electronic device, by using the first exposure time and the first frame interval, wherein the first frame interval is an interval between two adjacent frames of images captured by a camera; and
determining, by the electronic device, a third flicker period based on the first range, wherein the third flicker period is a flicker period of a third artificial light source in the photographing environment.

19. The non-statutory computer-readable storage medium of claim 18, wherein a luminous intensity of the first artificial light source is greater than a luminous intensity of the second artificial light source.

20. The non-statutory computer-readable storage medium of claim 18, wherein
when k1 times the first flicker period exceeds the first range, and k2 times the second flicker period does not exceed the first range, the first frame interval is determined as k1 times the first flicker period.

* * * * *